(12) United States Patent
Smith

(10) Patent No.: US 11,912,111 B1
(45) Date of Patent: Feb. 27, 2024

(54) VEHICLE COVER ASSEMBLY

(71) Applicant: Robert M. Smith, Marlette, MI (US)

(72) Inventor: Robert M. Smith, Marlette, MI (US)

(*) Notice: Subject to any disclaimer, the term of this patent is extended or adjusted under 35 U.S.C. 154(b) by 40 days.

(21) Appl. No.: 17/726,769

(22) Filed: Apr. 22, 2022

Related U.S. Application Data

(60) Provisional application No. 63/195,257, filed on Jun. 1, 2021.

(51) Int. Cl.
B60J 11/04 (2006.01)
E04H 15/06 (2006.01)

(52) U.S. Cl.
CPC .............. B60J 11/04 (2013.01); E04H 15/06 (2013.01)

(58) Field of Classification Search
CPC .. B60J 11/00; B60J 11/04; B60J 11/06; E04H 15/06
USPC ............................ 296/136.01, 136.11, 136.12
See application file for complete search history.

(56) References Cited

U.S. PATENT DOCUMENTS

| | | | | |
|---|---|---|---|---|
| 2,801,667 A * | 8/1957 | Curran | ...................... | B60J 11/00 296/136.1 |
| 4,310,194 A * | 1/1982 | Biller | ........................ | B60P 3/32 296/26.02 |
| 4,332,265 A * | 6/1982 | Baker | ........................ | B60P 3/34 296/159 |
| 4,400,993 A * | 8/1983 | Kobayashi | .......... | F16H 19/0672 74/501.5 R |
| 4,684,165 A * | 8/1987 | Becker | ...................... | B60J 11/00 296/136.12 |
| 4,938,522 A * | 7/1990 | Herron | ...................... | B60J 11/00 150/166 |
| 5,299,849 A * | 4/1994 | Cook | ......................... | B60J 7/104 296/159 |
| 5,752,736 A * | 5/1998 | Nodier | ...................... | B60J 7/102 296/159 |
| 5,911,467 A * | 6/1999 | Evans | ....................... | B60J 7/085 296/100.15 |
| 7,108,005 B1 * | 9/2006 | Christenson | ............ | E04H 15/06 296/159 |
| 7,172,234 B2 * | 2/2007 | Chang | ................... | F16B 7/1445 296/136.12 |
| 7,278,677 B2 * | 10/2007 | Emerson | .................. | B60J 11/06 296/136.12 |
| 7,677,641 B1 * | 3/2010 | Isoda | ....................... | B60P 3/341 135/88.13 |

(Continued)

Primary Examiner — Amy R Weisberg
Assistant Examiner — Veronica M Shull
(74) Attorney, Agent, or Firm — Buckert Patent & Trademark Law Firm PC; John F. Buckert

(57) ABSTRACT

A vehicle cover assembly includes a canopy assembly having a canopy and first and second adjustable tightening devices. The canopy has a front peripheral end portion, a rear peripheral end portion, and first and second side end portions. The first side end portion, the rear peripheral end portion, and the second side end portion define a first sleeve with a first aperture therein. The front peripheral end portion defines a second sleeve with a second aperture therein. The first adjustable tightening device extends through the first aperture, and the second adjustable tightening device extends through the second aperture to secure the canopy to the vehicle. The assembly includes a frame member coupled to the vehicle and the canopy. The canopy extends from a front cab portion to a rear end portion of the vehicle and over the frame member.

11 Claims, 24 Drawing Sheets

(56) References Cited

U.S. PATENT DOCUMENTS

2006/0267372 A1\* 11/2006 Funk ................. B60J 11/00
                                                                       296/136.12

\* cited by examiner

800 — User provides a canopy assembly having a canopy, first and second coupling brackets, first and second adjustable tightening devices and first, second, third, and fourth adjustable length strap assemblies, the canopy having a front peripheral end portion, a rear peripheral end portion, a first side end portion, and a second side end portion; the first side end portion, the rear peripheral end portion, and the second side end portion defining a first sleeve with a first aperture therein; the front peripheral end portion defining a second sleeve with a second aperture therein, the first and second adjustable tightening devices extending through the first and second apertures, respectively, of the first and second sleeves, respectively, the first and second coupling brackets being coupled to the canopy, the first and second adjustable length strap assemblies being coupled to the canopy proximate to and above the first side end portion, the third and fourth adjustable length strap assemblies being coupled to the canopy proximate to and above the second side end portion 802 — User couples first and second support members to a vehicle roof cross-member extending between first and second B-pillars of the vehicle 804 — User couples a frame member to a rear end portion of a vehicle body of the vehicle 806 — User positions the canopy on the vehicle such that the canopy extends from a front cab portion proximate the A-pillar of the vehicle to a rear end portion of the vehicle body and over the frame member and the first and second support members 808 — User inserts the first and second support members into the first and second coupling brackets, respectively, of the canopy assembly (A)

FIG. 30

VEHICLE COVER ASSEMBLY

CROSS-REFERENCE TO RELATED APPLICATIONS

This application claims priority to U.S. Provisional Patent Application No. 63/195,257 filed on Jun. 1, 2021, the entire contents of which are hereby incorporated by reference herein.

BACKGROUND

Recreational campers have been widely embraced by those that enjoy travelling and camping outdoors. One drawback with recreational campers is that the campers are relatively expensive to purchase. Another drawback is that it is relatively expensive to pull recreational campers due to the escalating gas prices.

The inventors herein have recognized a need for an improved vehicle cover assembly that can be coupled to the vehicle that minimizes the above-mentioned drawbacks.

SUMMARY

A vehicle cover assembly for a vehicle in accordance with an exemplary embodiment is provided. The vehicle cover assembly includes a canopy assembly having a canopy and first and second adjustable tightening devices. The canopy has a front peripheral end portion, a rear peripheral end portion, a first side end portion, and a second side end portion. The first side end portion, the rear peripheral end portion, and the second side end portion define a first sleeve with a first aperture therein. The front peripheral end portion defines a second sleeve with a second aperture therein. The first adjustable tightening device extends through the first aperture of the first sleeve to secure the canopy to the vehicle. The second adjustable tightening device extends through the second aperture of the second sleeve to secure the canopy to the vehicle. The vehicle cover assembly further includes a frame member removably coupled to and between the vehicle and the canopy. The canopy is sized and shaped to extend from a front cab portion of the vehicle to a rear end portion of the vehicle and over the frame member.

A method for coupling a vehicle cover assembly to a vehicle in accordance with another exemplary embodiment is provided. The method includes providing a canopy assembly having a canopy and first and second adjustable tightening devices. The canopy has a front peripheral end portion, a rear peripheral end portion, a first side end portion, and a second side end portion. The first side end portion, the rear peripheral end portion, and the second side end portion define a first sleeve with a first aperture therein. The front peripheral end portion defines a second sleeve with a second aperture therein. The first adjustable tightening device extends through the first aperture of the first sleeve. The second adjustable tightening device extends through the second aperture of the second sleeve. The method further includes coupling a frame member to the vehicle. The method further includes positioning the canopy on the vehicle such that the canopy extends from a front cab portion of the vehicle to a rear end portion of the vehicle and over the frame member. The method further includes securing first and second end portions of the first adjustable tightening device to the vehicle and then adjusting an effective length of the first adjustable tightening device to secure the canopy to the vehicle. The method further includes securing first and second end portions of the second adjustable tightening device to the vehicle and then adjusting an effective length of the second adjustable tightening device to secure the canopy to the vehicle,

BRIEF DESCRIPTION OF THE DRAWINGS

FIGS. 30 and 31 are flowcharts of a method for coupling the vehicle cover assembly to the vehicle of FIG. 1 in accordance with another exemplary embodiment.

DETAILED DESCRIPTION

Referring to FIGS. 1-7 and 32, a vehicle 10 and a vehicle cover assembly 20 in accordance with an exemplary embodiment is provided. The vehicle 10 and the vehicle cover assembly 20 define an interior region 22 (shown in FIG. 6) therein.

Figure 7:
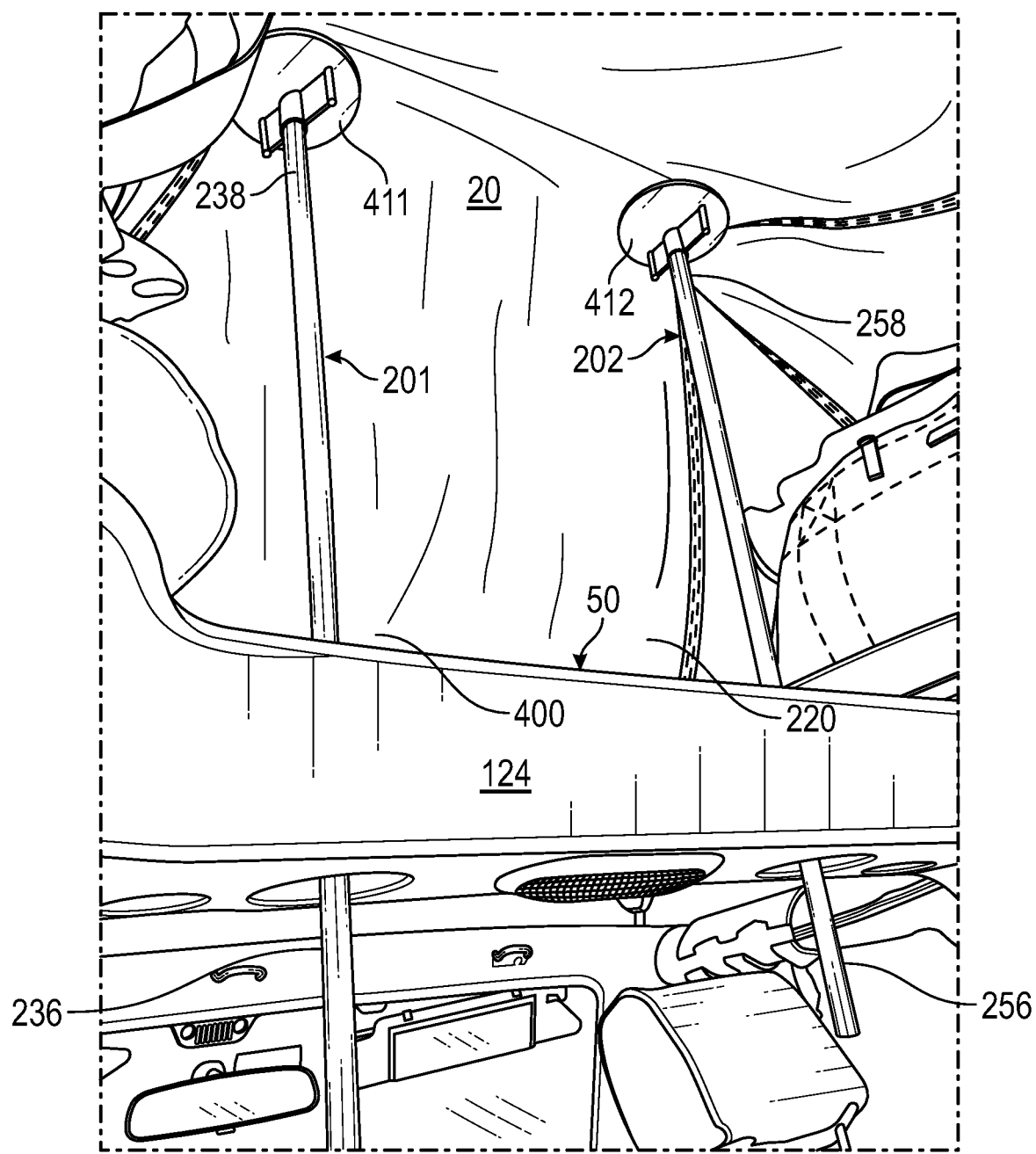
FIG. 7 is a schematic of an interior region of the vehicle and the vehicle cover assembly illustrating first and second support members for supporting the vehicle cover assembly.
Figure 11:
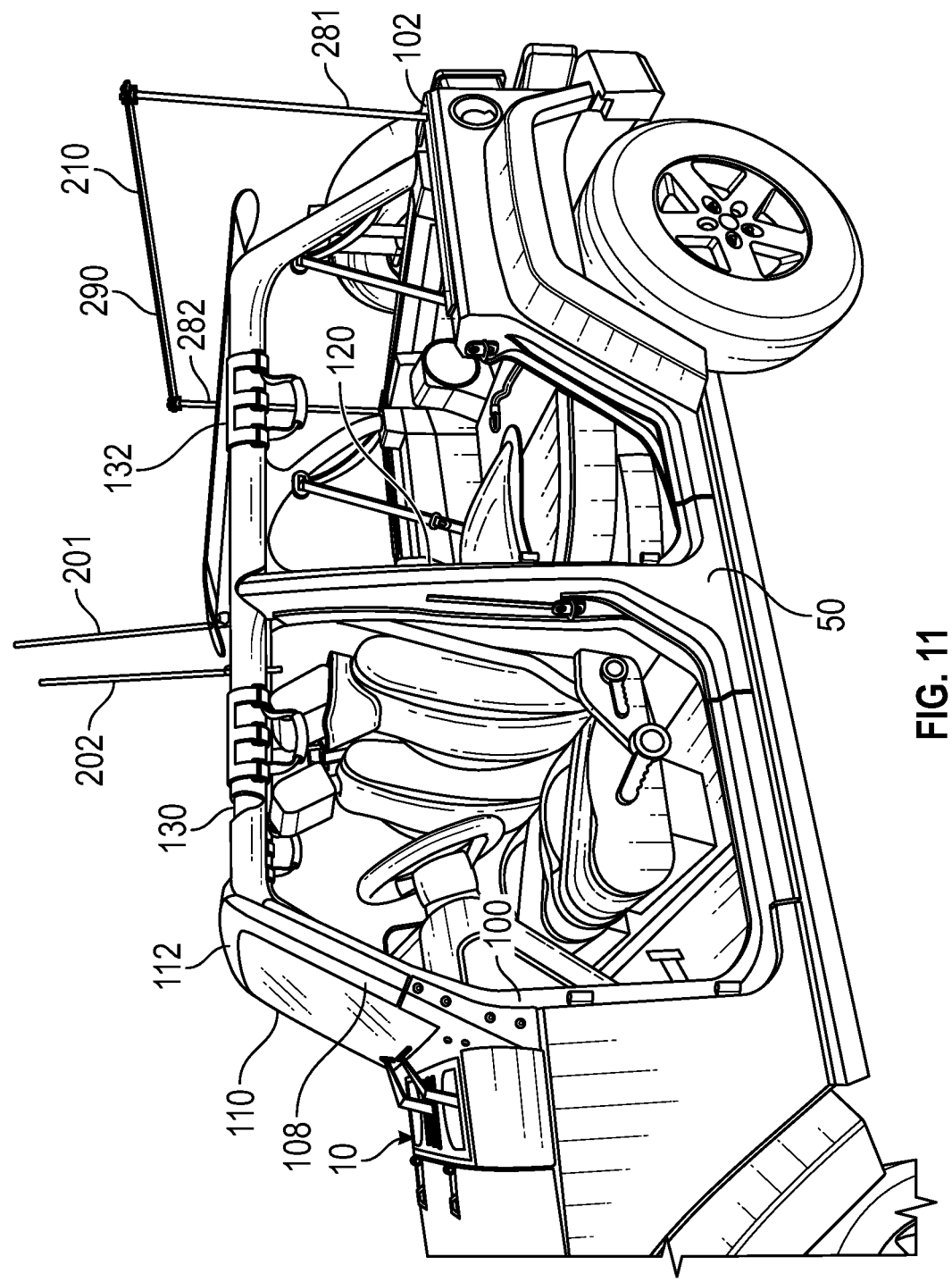
FIG. 11 is a schematic of the vehicle of FIG. 8 having first and second support members and a frame member coupled thereto.

Referring to FIGS. 7 and 11, an advantage of the vehicle cover assembly 20 is that the assembly 20 is removably coupled to the vehicle 10 to enclose a portion of the vehicle 10 for recreational purposes such as camping for example. In particular, the assembly 20 utilizes a frame member 210 (shown in FIG. 11) to support a canopy 400 (shown in FIG. 1) on the vehicle 10 and further utilizes first and second adjustable tightening devices 421, 422 (shown in FIG. 21) that extend through first and second sleeves 521, 542 of the canopy 400 to easily secure the canopy 400 to the vehicle 10.

Vehicle

Referring to FIGS. 8-13, the vehicle 10 includes a vehicle body 50, a first front wheel 52, a first rear wheel 54, a second front wheel 56, and a second rear wheel 58. The wheels 52, 54, 56, 58 are rotatably coupled to the vehicle body 50.

Figure 8:
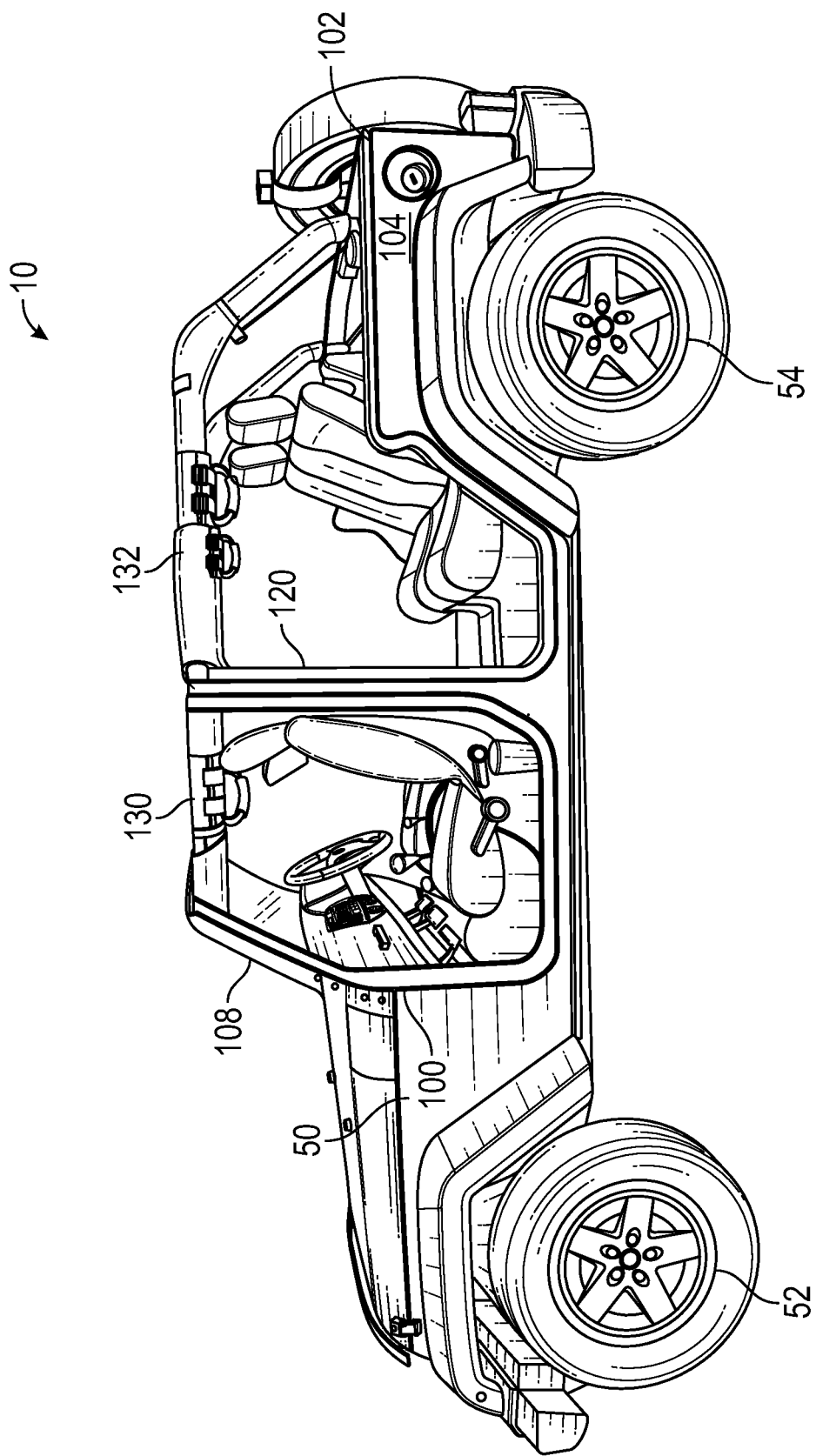
FIG. 8 is a schematic of the vehicle of FIG. 1.
Figure 9:
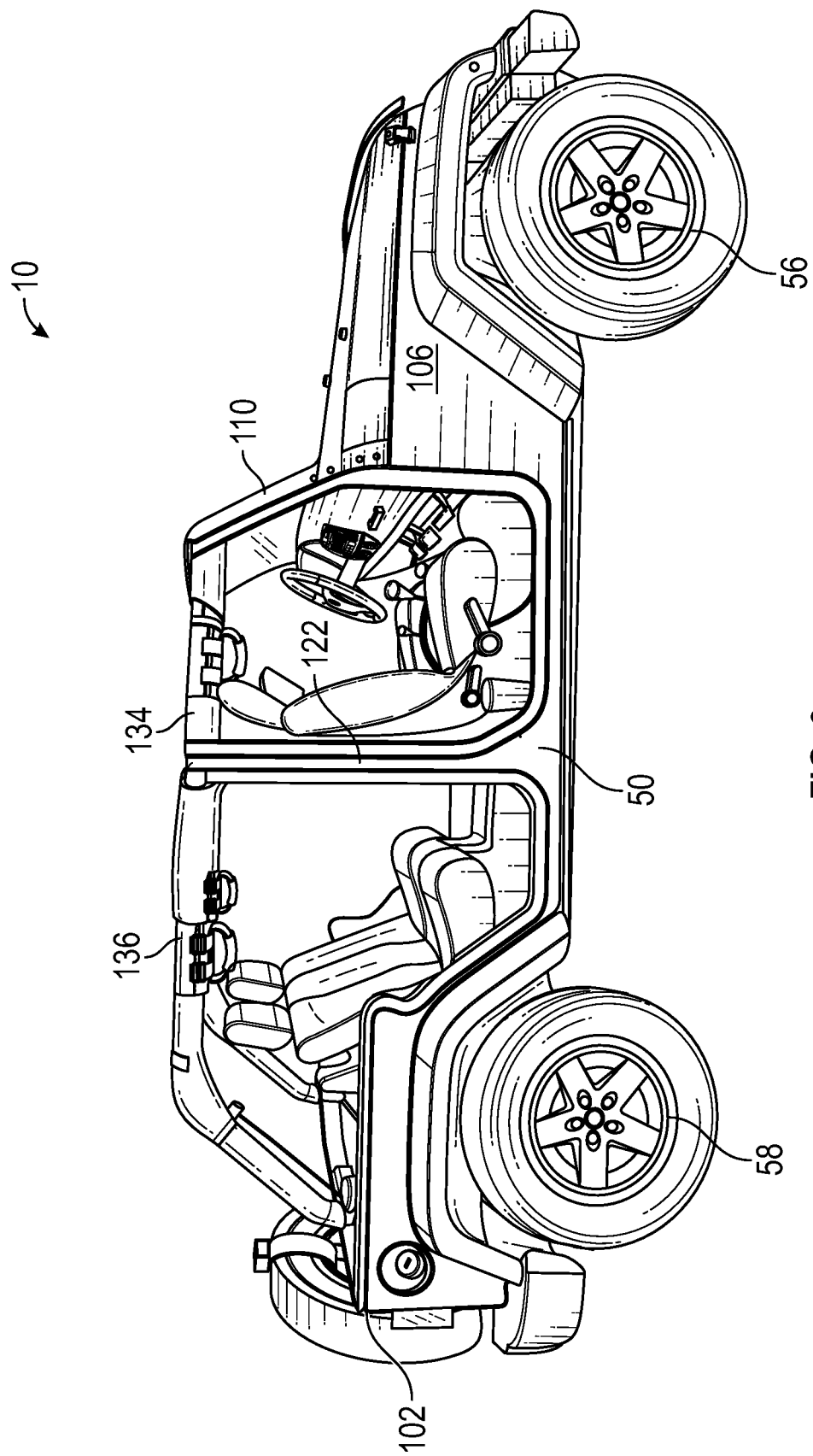
FIG. 9 is another schematic of the vehicle of FIG. 8.
Figure 10:
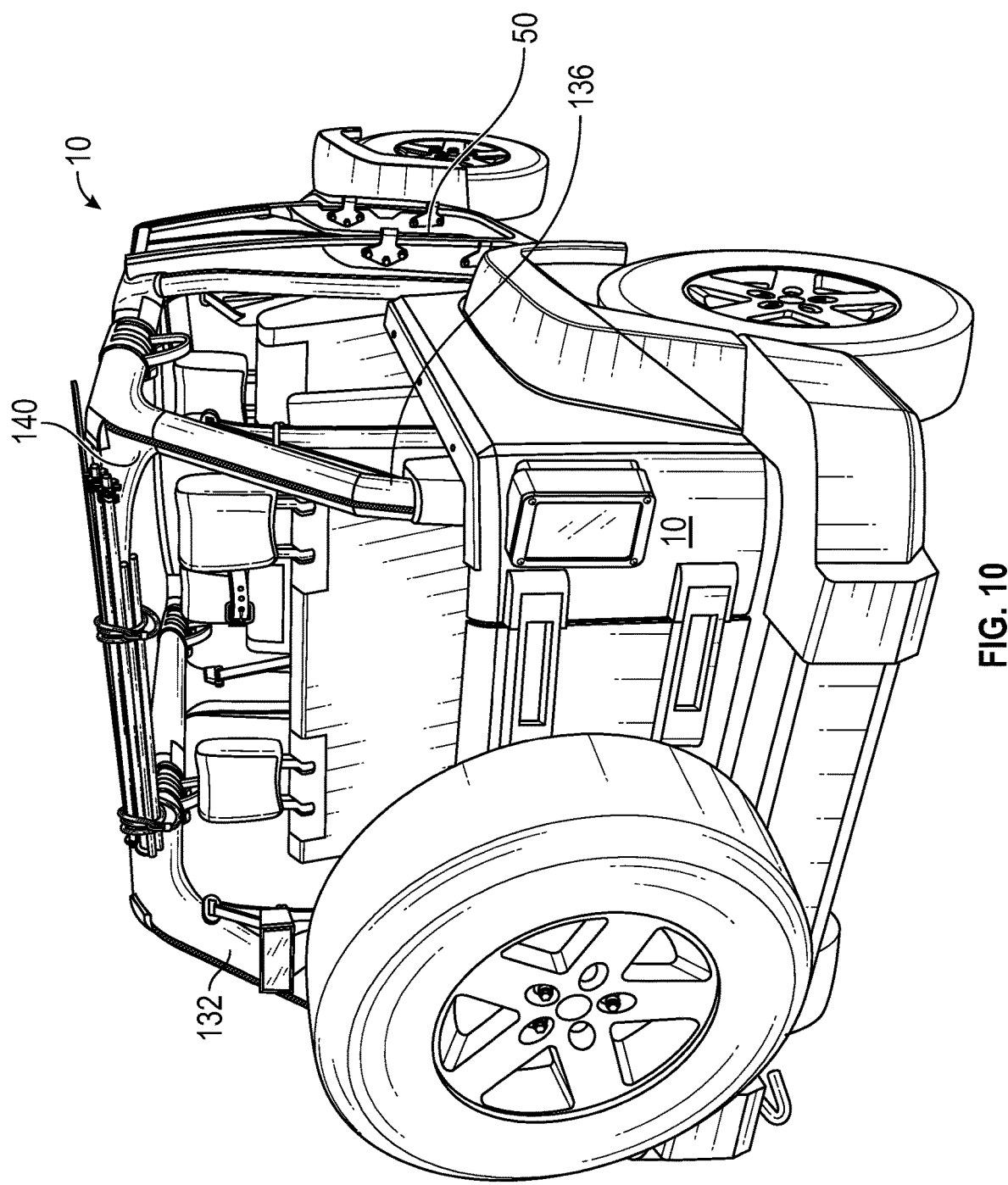
FIG. 10 is another schematic of the vehicle of FIG. 8 illustrating a rear portion thereof.

Referring to FIGS. 8-11, the vehicle body includes a front cab portion 100 (shown in FIG. 8), a rear end portion 102, a first side 104, a second side 106 (shown in FIG. 9), an A-pillar 108 (shown in FIG. 8), an A-pillar 110 (shown in FIG. 9), a cross-member 112 (shown in FIG. 11), a B-pillar 120 (shown in FIG. 8), a B-pillar 122 (shown in FIG. 9), a cross-member 124 (shown in FIG. 12), roof bars 130, 132 (shown in FIG. 8), roof bars 134, 136 (shown in FIG. 9), and a cross-member 140 (shown in FIG. 10).

Referring to FIG. 11, the front cab portion 100 is disposed proximate to the A-pillars 108, 110. The cross-member 112 is coupled to and extends between the A-pillars 108, 110.

Referring to FIGS. 8 and 9, the B-pillars 120, 122 are disposed rearward of the A-pillars 108, 110. The cross-member 124 is coupled to and extends between the B-pillars 120, 122.

Referring to FIG. 11, the roof bar 130 is coupled to and extends between the A-pillar 108 and the B-pillar 120. Further, the roof bar 132 is coupled to and extends between the B-pillar 120 an the rear end portion 102.

Referring to FIG. 9, the roof bar 134 is coupled to and extends between the A-pillar 110 and the B-pillar 122. Further, the roof bar 136 is coupled to and extends between the B-pillar 120 and the rear end portion 102.

Vehicle Cover Assembly

Referring to FIGS. 1-7, the vehicle cover assembly 20 in accordance with an exemplary embodiment is provided to enclose an interior region (shown in FIG. 6) of the vehicle 10 from the front cab portion 110 (shown in FIG. 8) to the rear end portion 102. The vehicle cover assembly 20 includes a first support member 201 (shown in FIG. 11), a second support member 202, a frame member 210, and a canopy assembly 220 (shown in FIG. 1).

Figure 14:
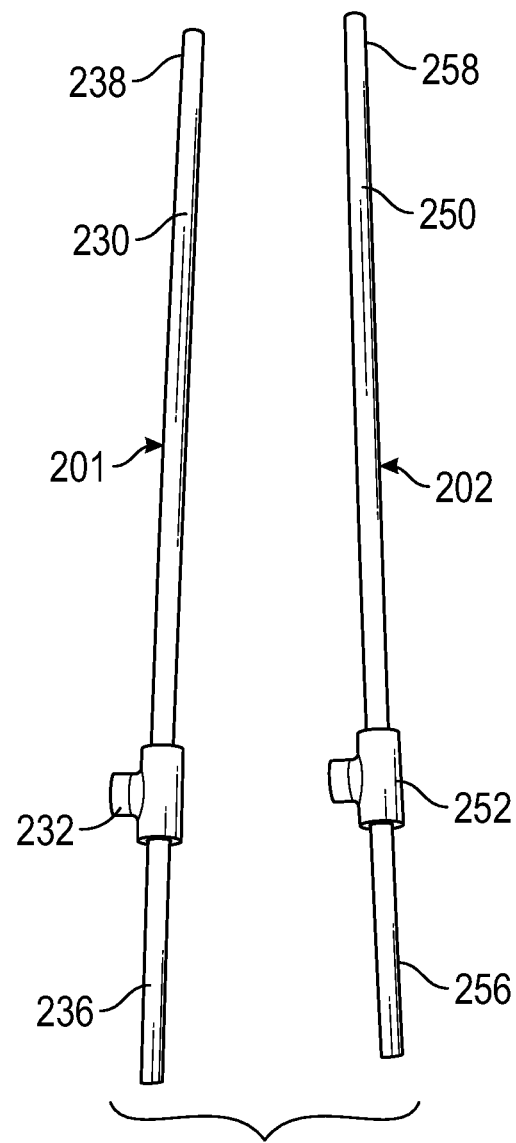
FIG. 14 is a schematic of the first and second support members.

Referring to FIGS. 7 and 14, the first and second support members 201, 202 are provided to support a portion of the canopy assembly 220 (shown in FIG. 1) above a portion of the vehicle body 50.

First Support Member

The first support member 201 includes a shaft portion 230 and an extension portion 232. The shaft portion 230 includes a first end portion 236 and a second end portion 238. The extension portion 232 is coupled to the shaft portion 230 between the first end portion 236 and the second end portion 238, and the extension portion 232 extends outwardly from the shaft portion 230.

Figure 12:
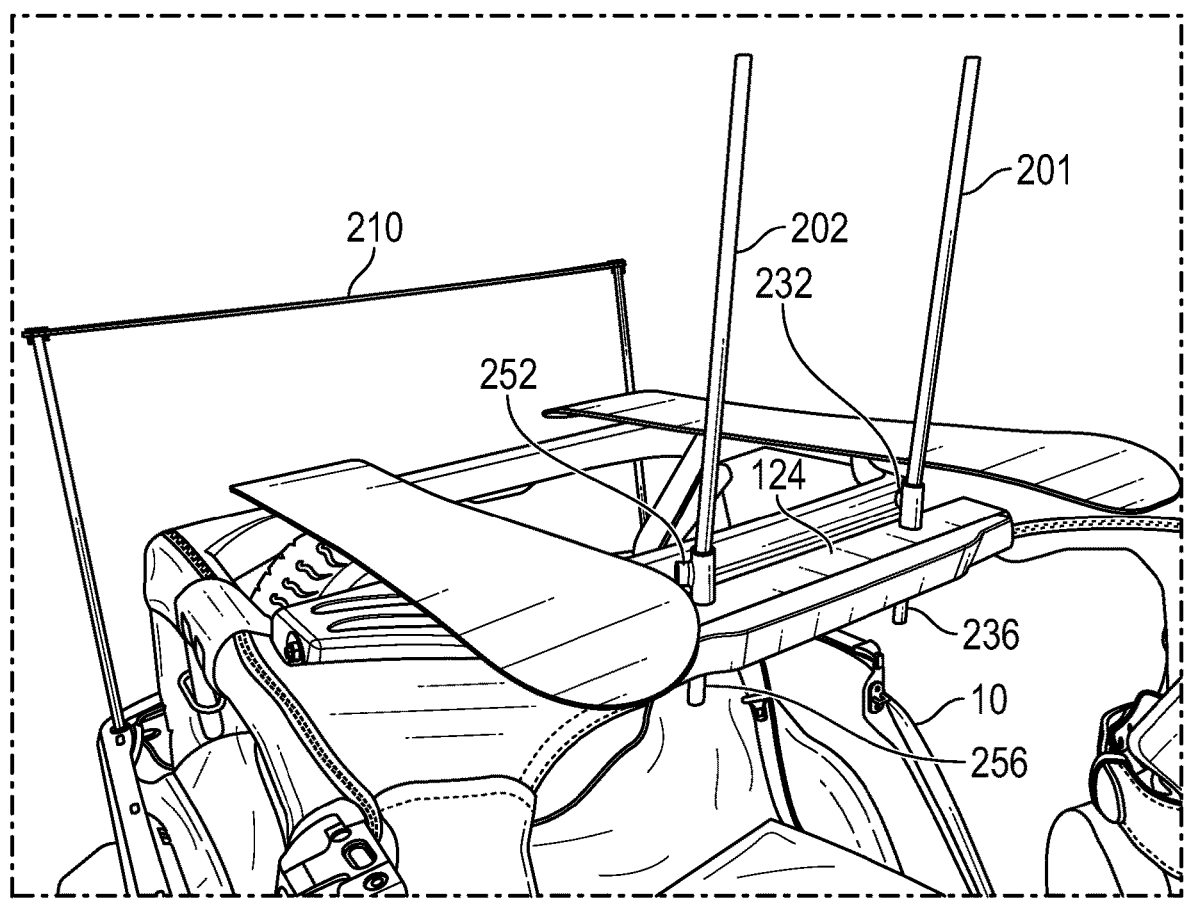
FIG. 12 is another schematic of the vehicle of FIG. 11 having the first and second support members and the frame member coupled thereto.
Figure 13:
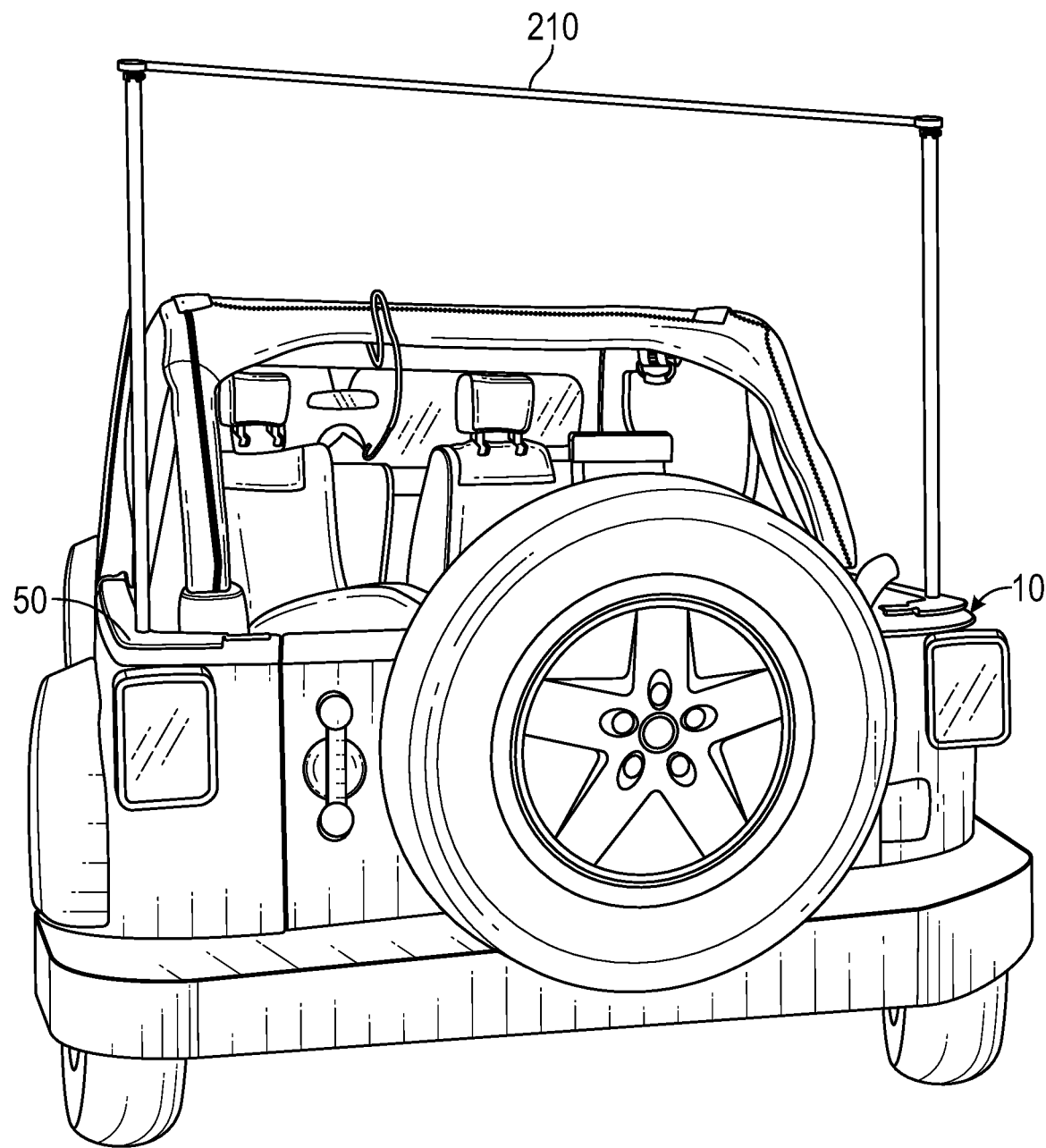
FIG. 13 is another schematic of the vehicle of FIG. 8 having the frame member coupled thereto.

Referring to FIG. 12, the first end portion 236 of the first support member 201 is disposed through an aperture in the cross-member 124 and the extension portion 232 abuts against a top surface of the cross-member 124 for holding the first support member 201 on the cross-member 124.

Referring to FIG. 7, the second end portion 238 of the first support member 201 is disposed within the first coupling bracket 411 of the canopy assembly 220 such that the first support member 201 supports the canopy assembly 220 above a portion of the vehicle body 50.

Second Support Member

Referring to FIG. 14, the second support member 202 includes a shaft portion 250 and an extension portion 252. The shaft portion 250 includes a first end portion 256 and a second end portion 258. The extension portion 252 is coupled to the shaft portion 250 between the first end portion 256 and the second end portion 258, and the extension portion 252 extends outwardly from the shaft portion 250.

Referring to FIG. 12, the first end portion 256 of the second support member 202 is disposed through an aperture in the cross-member 124 and the extension portion 252 abuts against the top surface of the cross-member 124 for holding the second support member 202 on the cross-member 124.

Referring to FIG. 7, the second end portion 258 of the second support member 202 is disposed within the second coupling bracket 412 of the canopy assembly 220 such that the second support member 202 supports the canopy assembly 220 above a portion the vehicle body 50.

Frame Member

Referring to FIGS. 15-19, the frame member 210 is provided to support a rear portion of the canopy assembly 220 (shown in FIG. 1) above a portion of the vehicle body 50. The frame member 210 includes a first vertical member 281, a second vertical member 282, a cross-member 290, a coupling bracket 294 (shown in FIG. 16), a coupling nut 296, washers 298, 300 (shown in FIG. 17), a coupling nut 302, a coupling bracket 314 (shown in FIG. 19), a coupling nut 316, washers 318, 320 (shown in FIG. 20), and a coupling nut 322.

First Vertical Member

Figure 15:
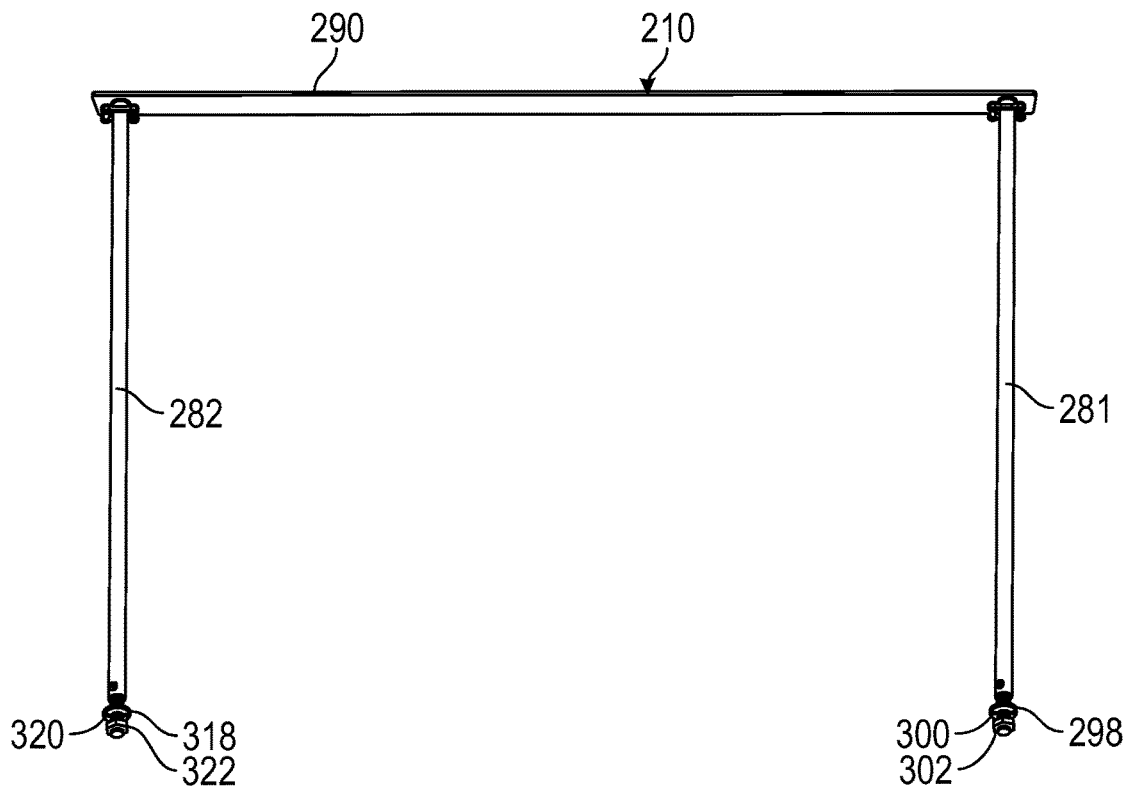
FIG. 15 is a schematic of the frame member.
Figure 16:
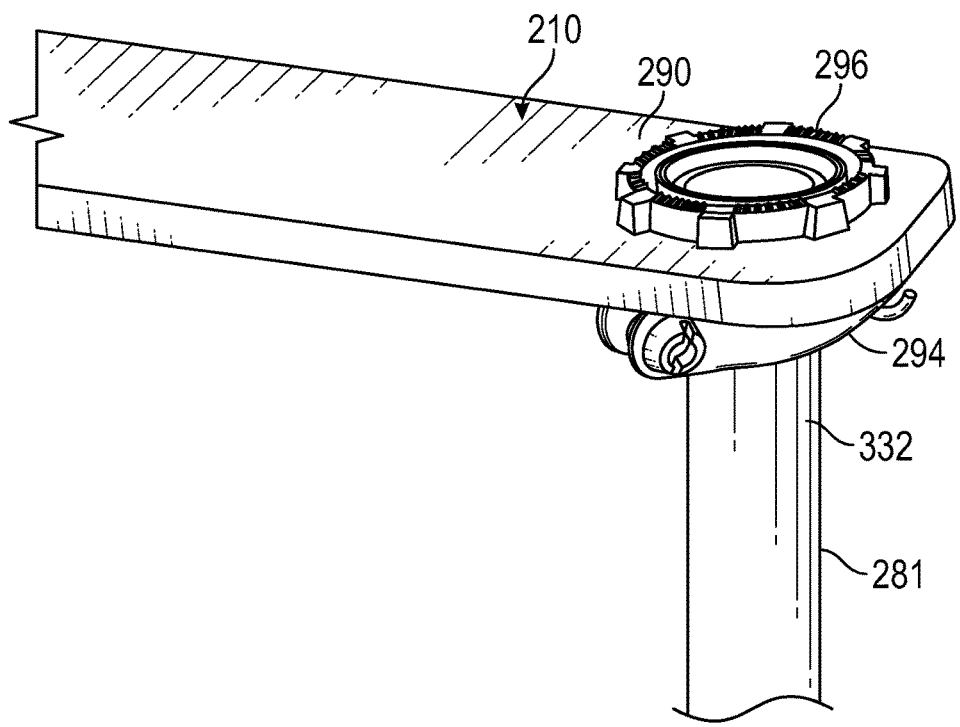
FIG. 16 is an enlarged schematic of a portion of the frame member of FIG. 15.
Figure 17:
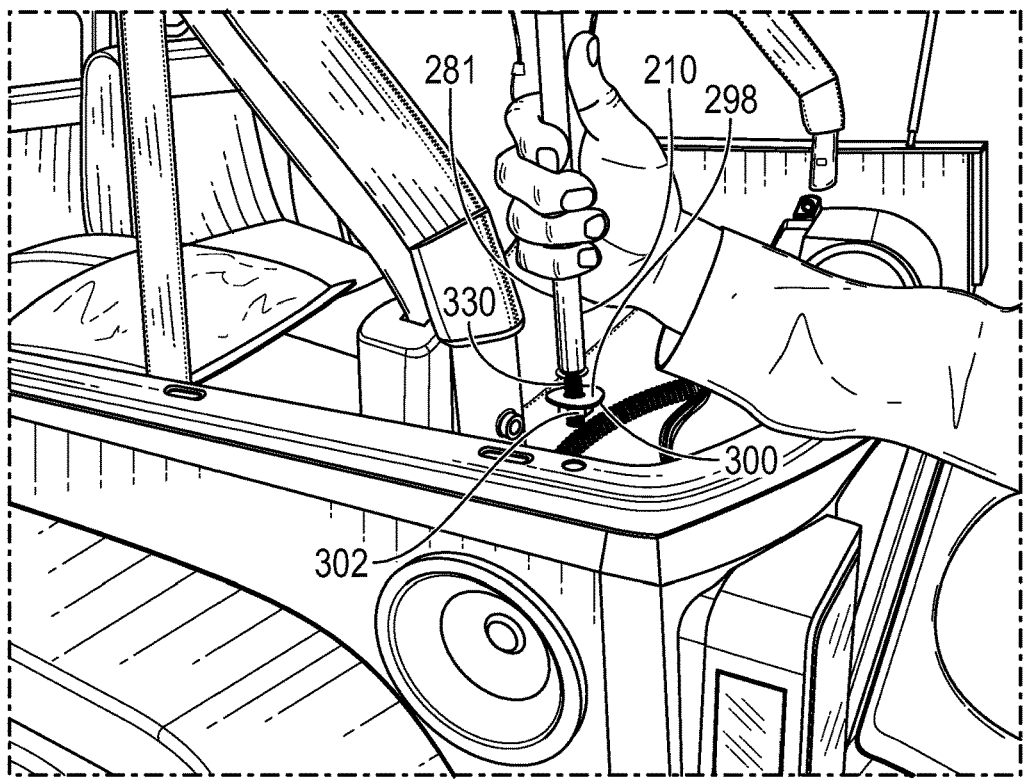
FIG. 17 is a schematic of a rear end portion of the vehicle of FIG. 1 having a portion of the frame member attached thereto.

Referring to FIGS. 15-18, the first vertical member 281 includes a threaded end portion 330 (shown in FIG. 18) and an end portion 332 (shown in FIG. 16).

Figure 18:
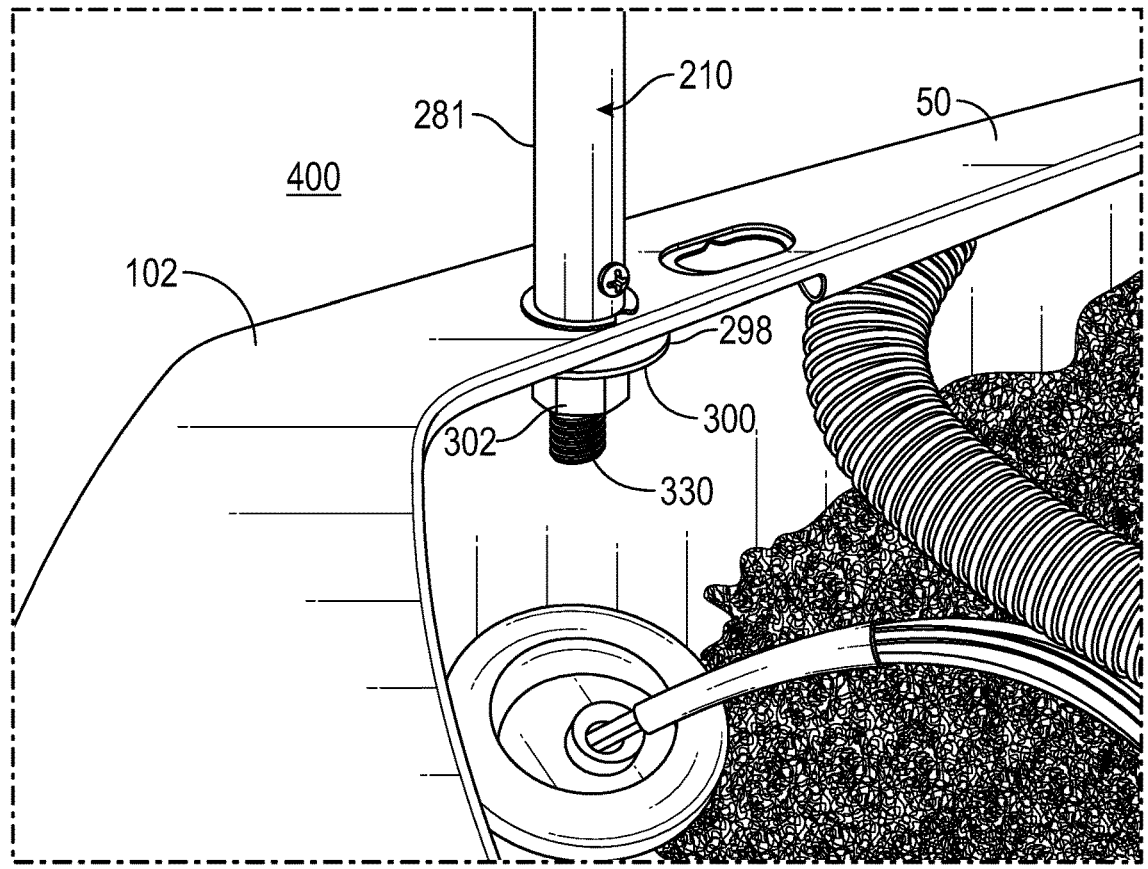
FIG. 18 is a schematic of a rear end portion of the vehicle of FIG. 11 having a portion of the frame member attached thereto.

Referring to FIG. 18, the threaded end portion 330 is disposed through an aperture in the rear end portion 102 of the vehicle body 50. Further, the threaded end portion 330 extends through the washers 298, 300, and the nut 302 is threadably coupled on the threaded end portion 330 to couple the first vertical member 281 to the rear end portion 102 of the vehicle body 50.

Referring to FIG. 16, the end portion 332 is disposed through an aperture of the coupling bracket 294 and an aperture in the cross-member 290. The coupling bracket 294 is coupled to the end portion 332 below the cross-member 290 and includes a threaded portion that extends through the aperture of the cross-member 290. The coupling nut 296 is threadably coupled to the threaded portion of the coupling bracket 294 to couple the first vertical member 281 to the cross-member 290.

Second Vertical Member

Figure 19:
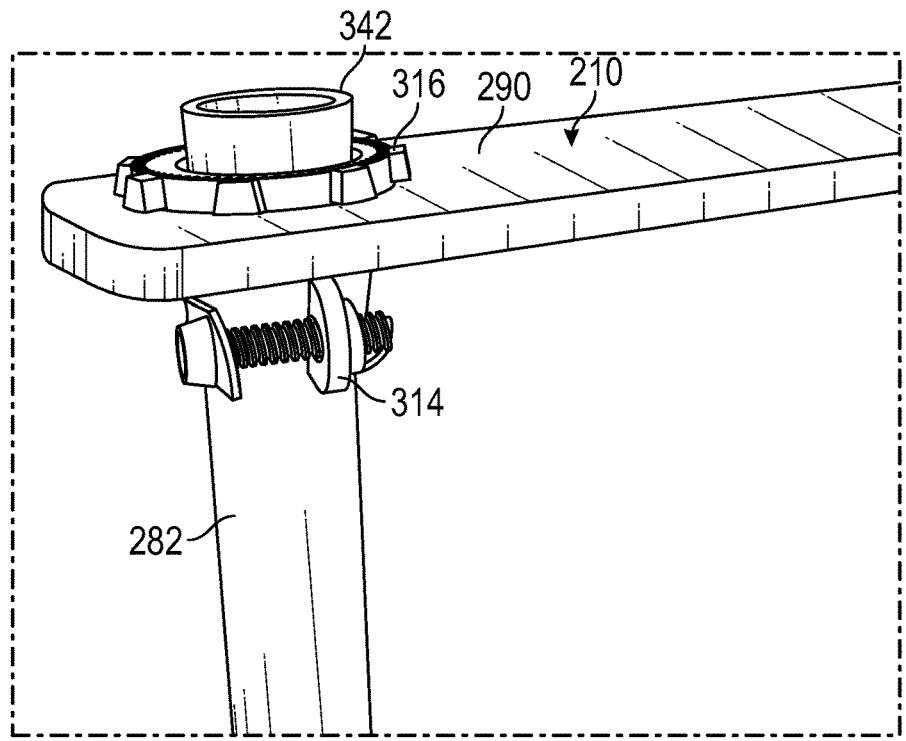
FIG. 19 is another enlarged schematic of another portion of the frame member of FIG. 15.
Figure 20:
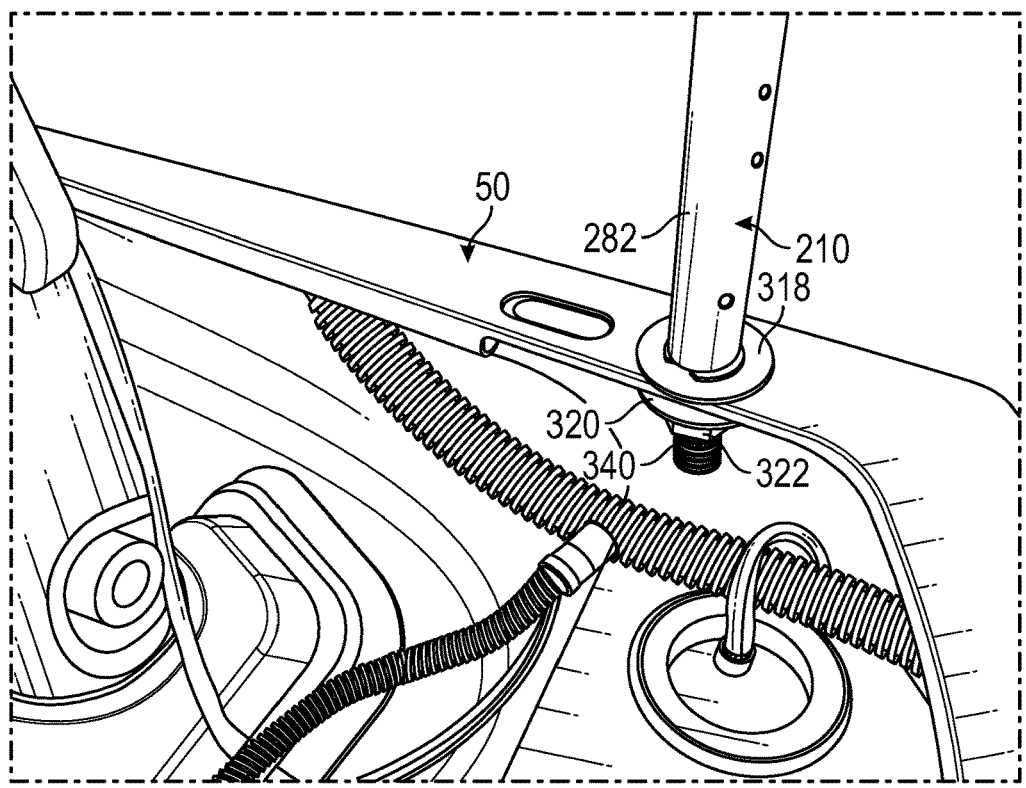
FIG. 20 is a schematic of a rear end portion of the vehicle of FIG. 1 having a portion of the frame member attached thereto.

Referring to FIGS. 15, 19 and 20, the second vertical member 282 includes a threaded end portion 340 (shown in FIG. 20) and an end portion 342 (shown in FIG. 19).

Referring to FIG. 20, the threaded end portion 340 is disposed through an aperture in the rear end portion 102 of the vehicle body 50. Further, the threaded end portion 340 extends through the washers 318, 320 and the nut 322 is threadably coupled on the threaded end portion 340 to couple the second vertical member 282 to the rear end portion 102 of the vehicle body 50.

Referring to FIG. 19, the end portion 342 is disposed through an aperture of the coupling bracket 314 and an aperture in the cross-member 290. The coupling bracket 314 is coupled to the end portion 342 below the cross-member 290 and includes a threaded portion that extends through the aperture of the cross-member 290. The coupling nut 316 is threadably coupled to the threaded portion of the coupling bracket 314 to couple the second vertical member 282 to the cross-member 290.

Canopy Assembly

Referring to FIGS. 1-5 and 21-29, the canopy assembly 220 is provided to enclose an interior region (shown in FIG. 6) of the vehicle 10 from the front cab portion 100 (shown in FIG. 8) to the rear end portion 102—and a top portion of canopy assembly 220 is supported by the first and second support members 201, 202 (shown in FIG. 11), and the frame member 210. The canopy assembly 220 includes a canopy 400 (shown in FIG. 1), a first coupling bracket 411 (shown in FIG. 7), a second coupling bracket 412, a first adjustable tightening device 421 (shown in FIG. 21), a second adjustable tightening device 422, a first adjustable length strap assembly 431 (shown in FIG. 22), a second adjustable length strap assembly 432 (shown in FIGS. 23 and 24), a third adjustable length strap assembly 433 (shown in FIG. 28), a fourth adjustable length strap assembly 434 (shown in FIG. 29), a first plurality of zipper teeth 451 (shown in FIG. 2), a second plurality of zipper teeth 452, a third plurality of zipper teeth 453, and the fourth plurality of zipper teeth 454.

Canopy

Figure 1:
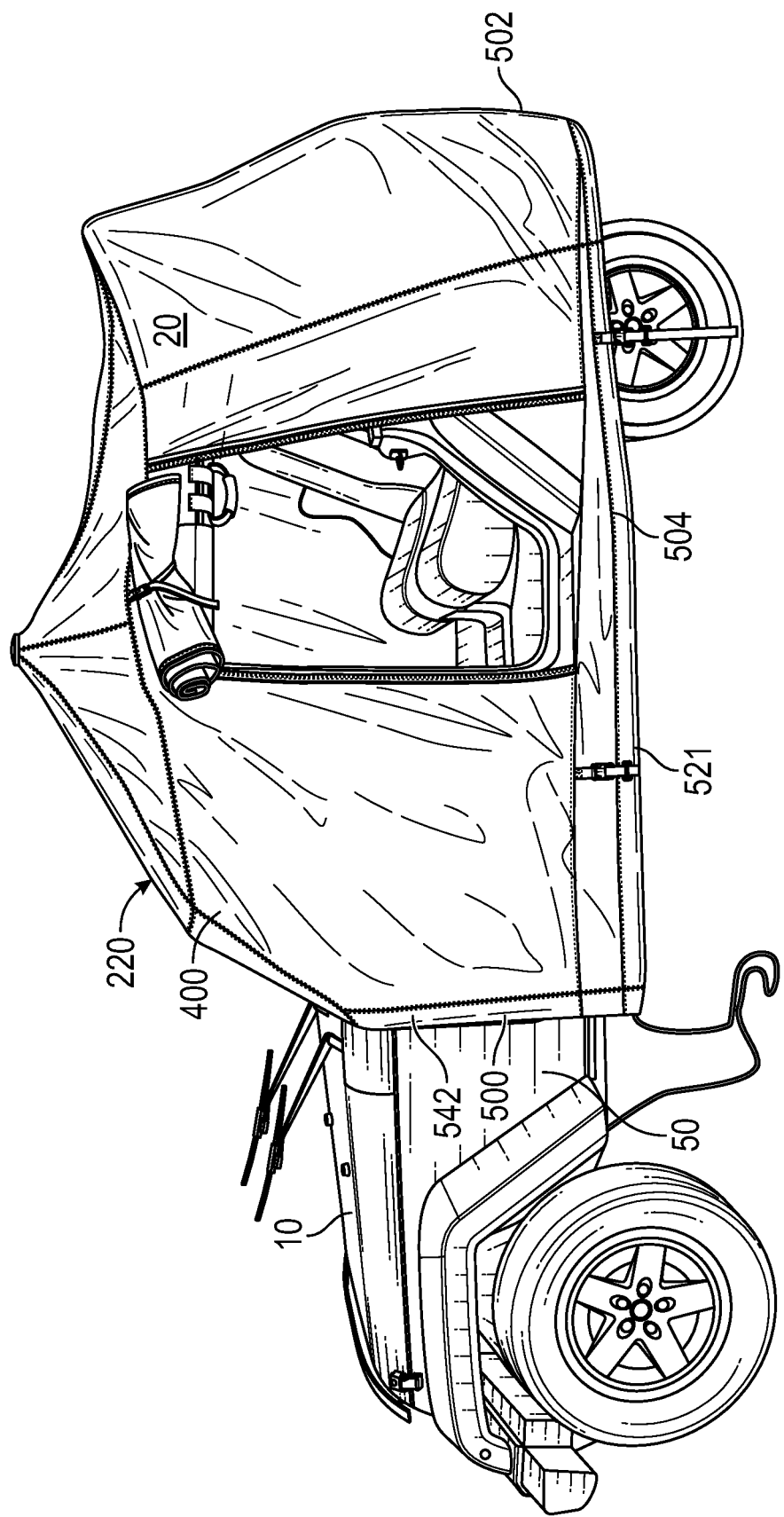
FIG. 1 is a schematic of a vehicle with a vehicle cover assembly in accordance with an exemplary embodiment coupled thereto.
Figure 2:
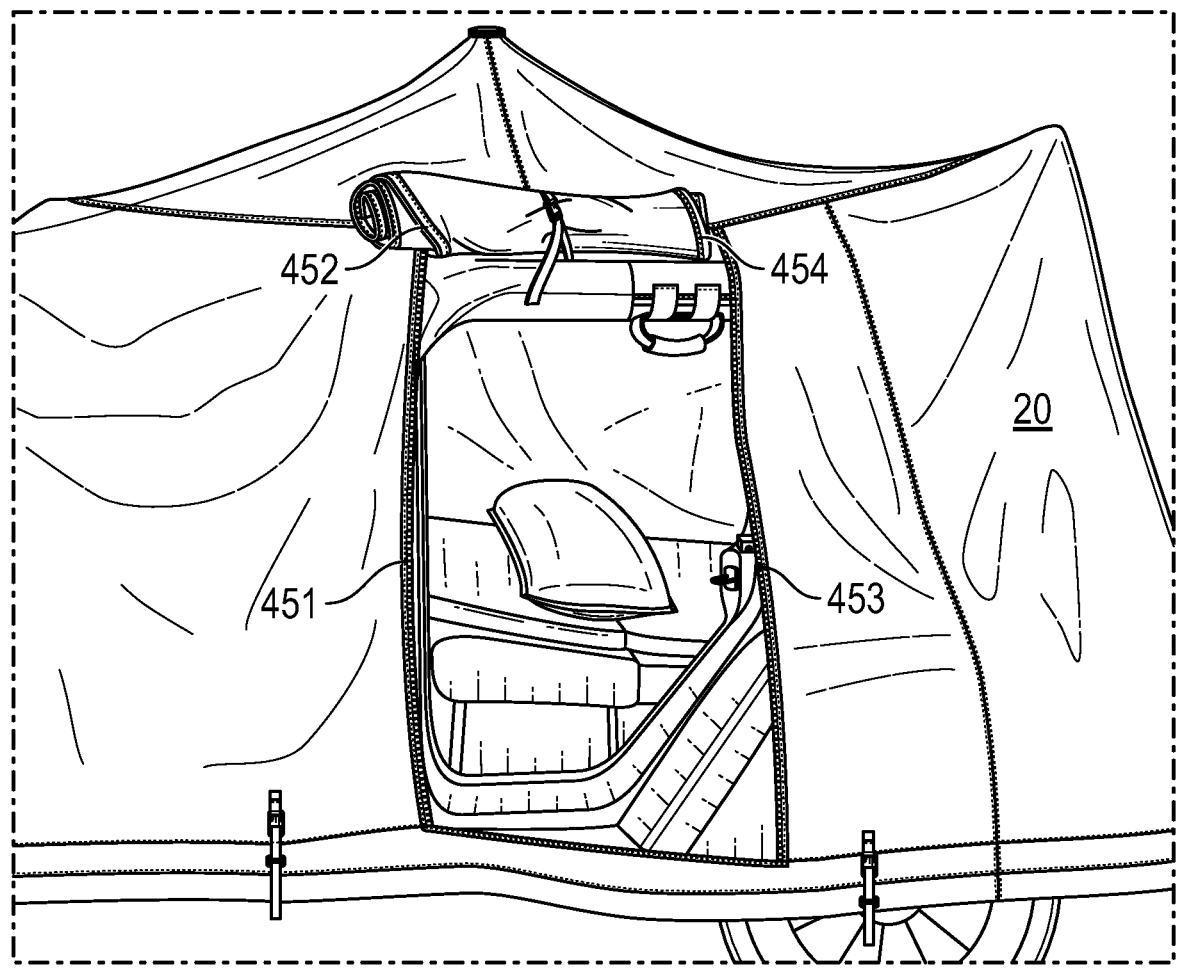
FIG. 2 is an enlarged schematic of a portion of the vehicle and the vehicle cover assembly of FIG. 1 illustrating of door on the vehicle cover assembly.
Figure 3:
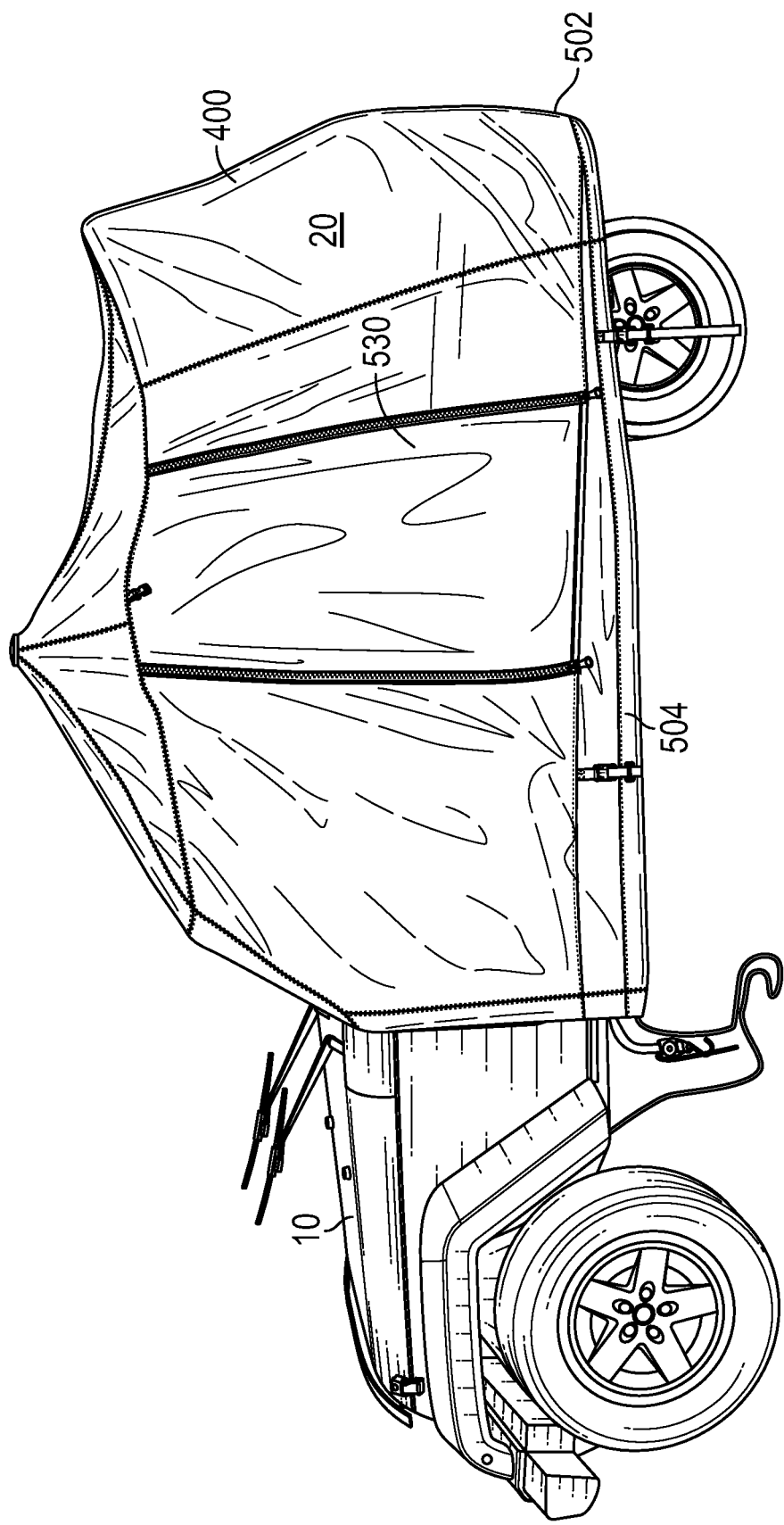
FIG. 3 is another schematic of the vehicle and the vehicle cover assembly of FIG. 1.
Figure 4:
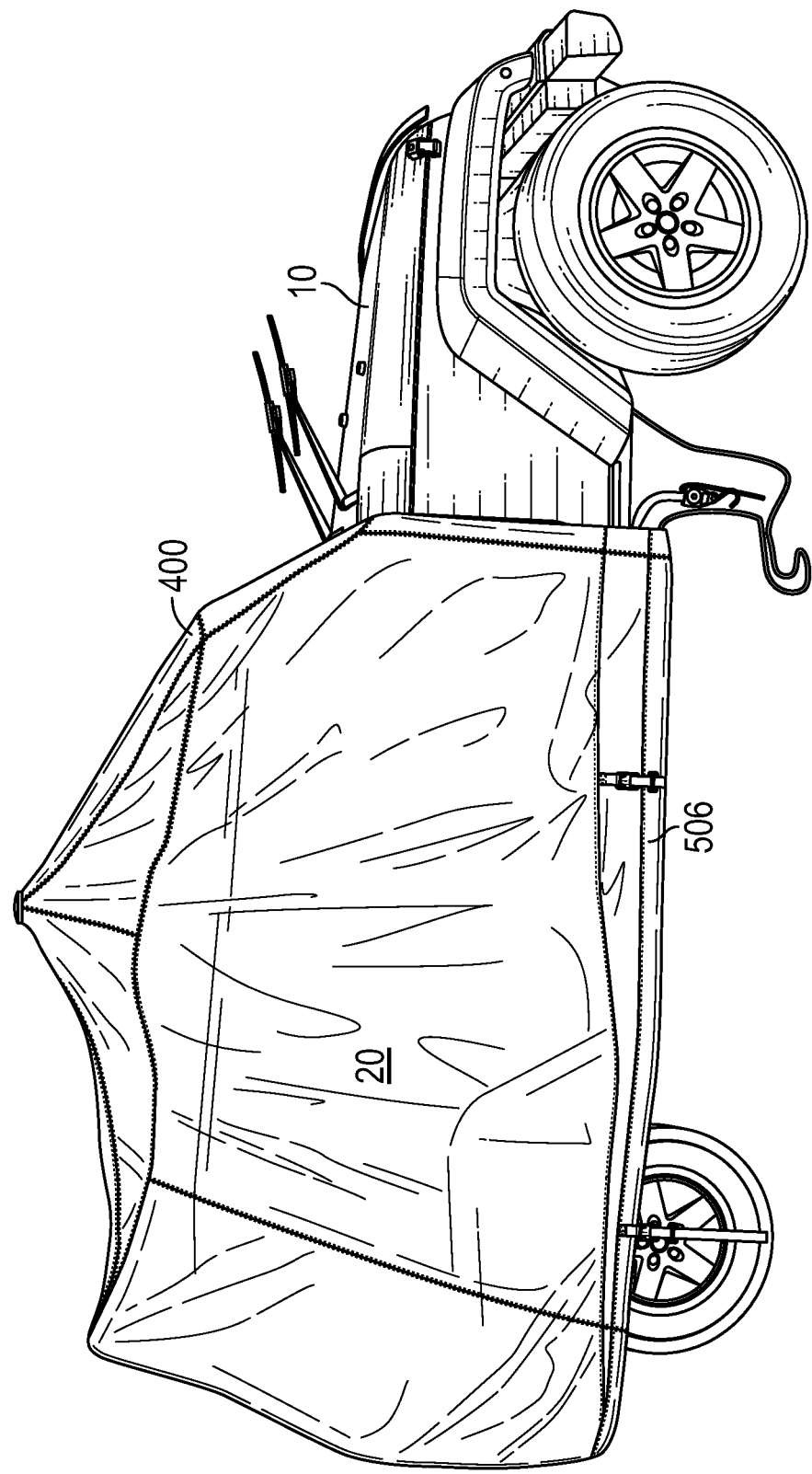
FIG. 4 is another schematic of the vehicle and the vehicle cover assembly of FIG. 1.
Figure 5:
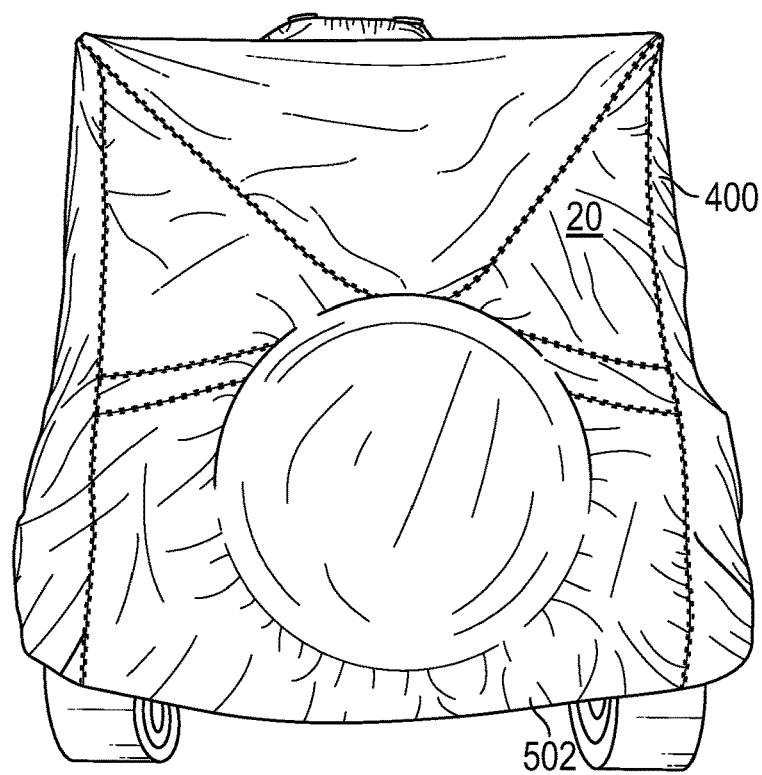
FIG. 5 is another schematic of the vehicle and the vehicle cover assembly of FIG. 1 illustrating a rear portion thereof.
Figure 6:
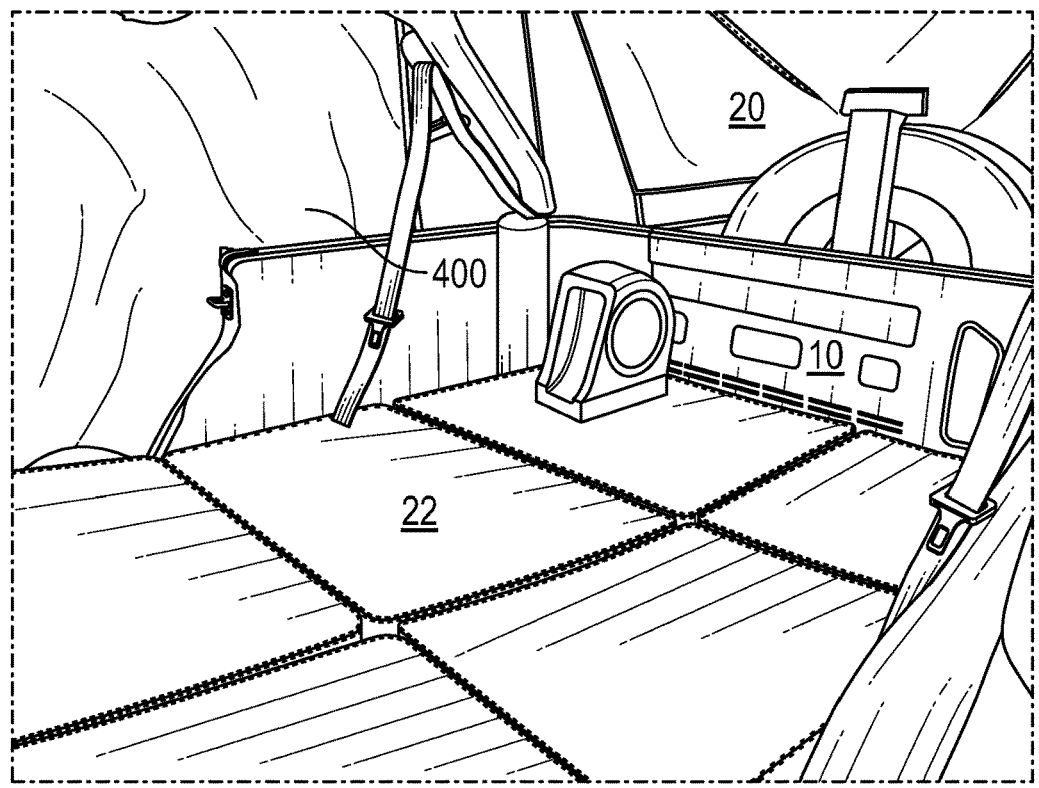
FIG. 6 is a schematic of an interior region defined by the vehicle and the vehicle cover assembly.

Referring to FIGS. 1, 4 and 5, the canopy 400 is sized and shaped to enclose an interior region 22 (shown in FIG. 6) of the vehicle 10. In an exemplary embodiment, the canopy 400 is a fabric canopy. The term "fabric" includes for example a waterproof canvas, a water-resistance canvas, a waterproof nylon, a water-resistant nylon, a mosquito netting, or combinations thereof. Alternately, the canopy 400 is a pliable polymeric or plastic sheet. The canopy 400 includes a front peripheral end portion 500 (shown in FIG. 1), a rear peripheral end portion 502 (shown in FIG. 5), a first side end portion 504 (shown in FIG. 1), a second side end portion 506 (shown in FIG. 4), and a door 530 (shown in FIG. 3).

Referring to FIGS. 1, 4, 5, and 21, the first side end portion 504 (shown in FIG. 1), the rear peripheral end portion 502 (shown in FIG. 5), and the second side end portion 506 (shown in FIG. 4) define a first sleeve 521 (shown in FIG. 21) with a first aperture 531 therein. The front peripheral end portion 500 defines a second sleeve 542 with a second aperture 552 therein.

Referring to FIGS. 1 and 3, the door 530 is provided to allow a user to enter an interior region 22 (shown in FIG. 6) defined by the vehicle 10 and the canopy 400. The door 530 is disposed between the front peripheral and portion 500 and the rear peripheral end portion 502.

First Adjustable Tightening Device

Figure 21:
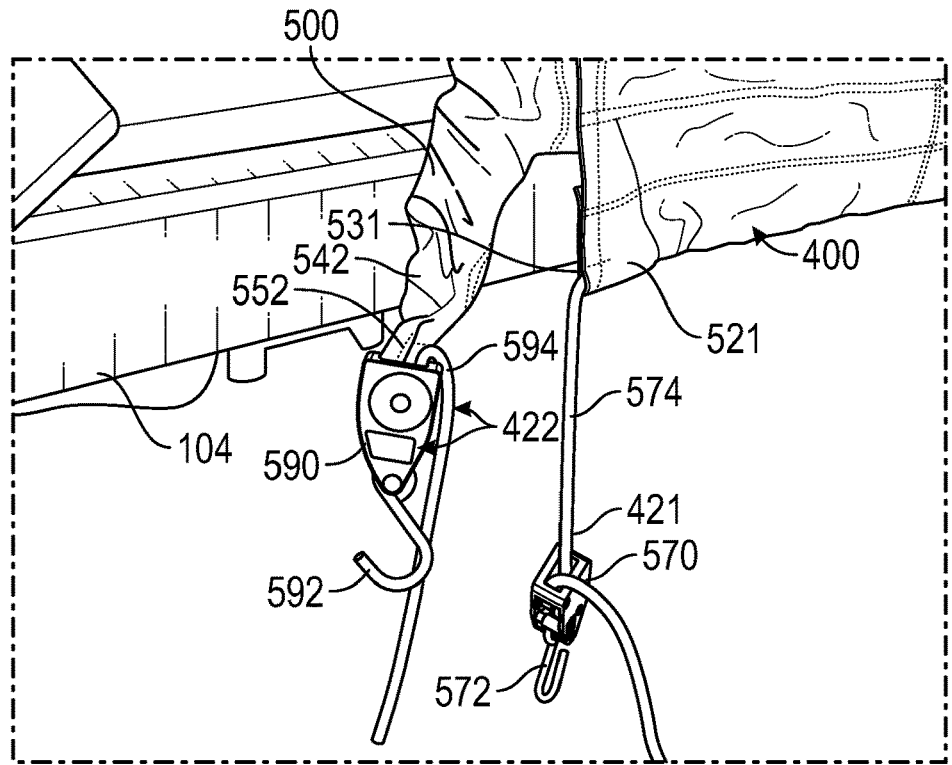
FIG. 21 is an enlarged schematic of a portion of a canopy assembly having first and second adjustable tightening devices in the vehicle cover assembly of FIG. 1 to secure the canopy assembly to the vehicle.
Figure 24:
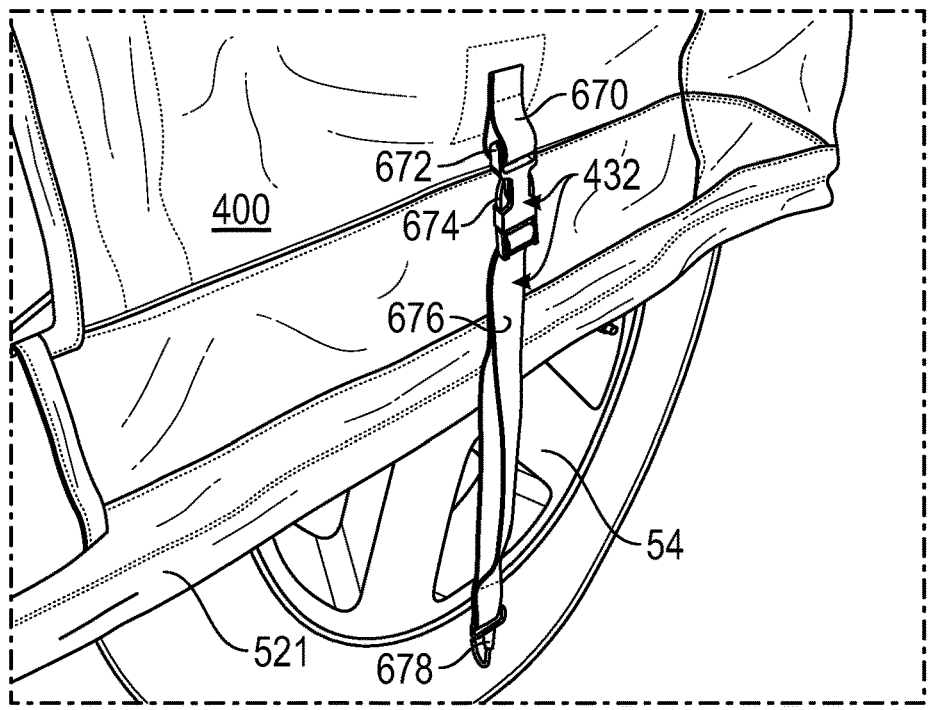
FIG. 24 is another enlarged schematic of the second adjustable length strap assembly of FIG. 23.
Figure 25:
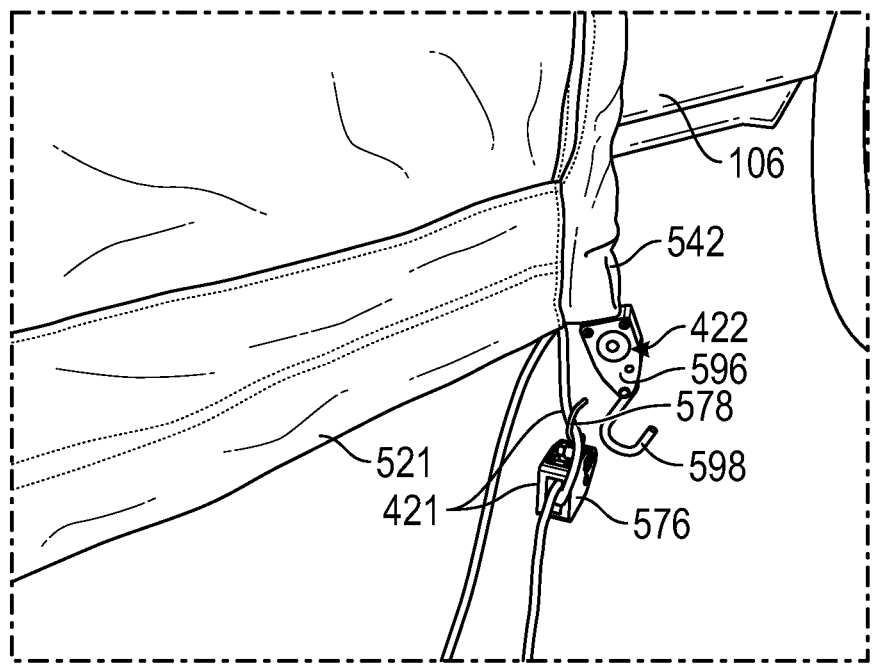
FIG. 25 is an enlarged schematic of a portion of the canopy assembly having first and second adjustable tightening devices therein to secure the canopy assembly to the vehicle.
Figure 26:
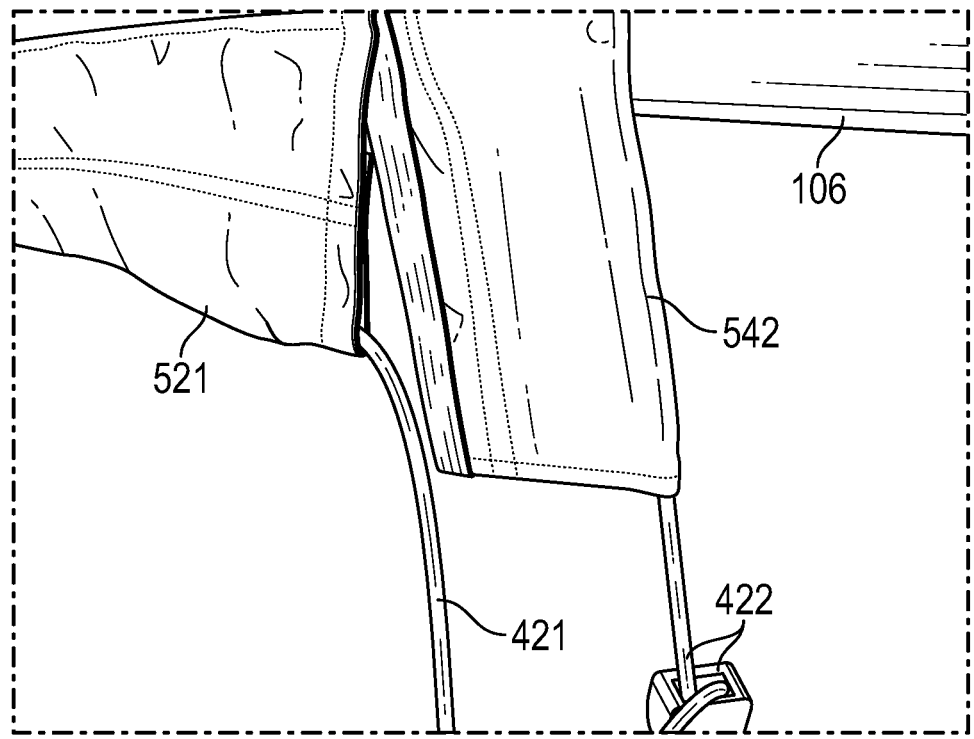
FIG. 26 is another enlarged schematic of the portion of the canopy assembly having first and second adjustable tightening devices of FIG. 25.
Figure 27:
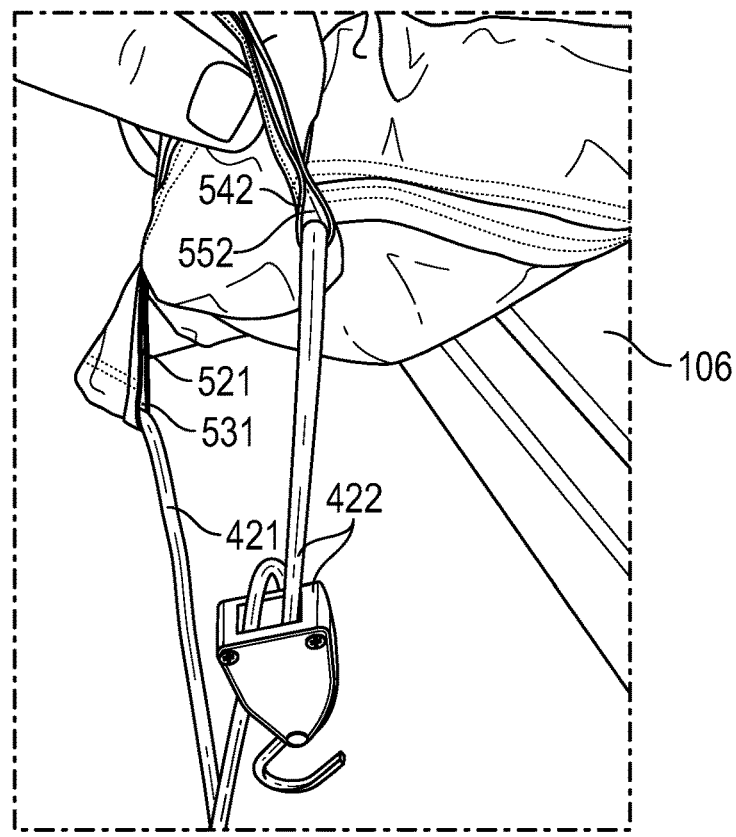
FIG. 27 is another enlarged schematic of the portion of the canopy assembly having first and second adjustable tightening devices of FIG. 25.

Referring to FIGS. 21 and 25, the first adjustable tightening device 421 is provided to secure a lower portion of the canopy 400 to the vehicle 10. The first adjustable tightening device 421 includes a ratchet pulley 570 (shown in FIG. 24), a hook member 572, a cord 574 (that extends through the first sleeve 521), a ratchet pulley 576 (shown in FIG. 25), and a hook member 578.

The hook member 572 (shown in FIG. 21) is coupled to the ratchet pulley 570. The cord 574 is coupled to the ratchet pulley 570 and extends through the first aperture 531 of the first sleeve 521 to the ratchet pulley 576. The hook member 578 is further coupled to the ratchet pulley 576. During operation, the hook member 572 is secured to a portion of the vehicle body 50 proximate to the first front wheel 52 (shown in FIG. 8), and the hook member 578 is secured to a portion of the vehicle body 50 proximate to the second front wheel 56 (shown in FIG. 9). Further, the ratchet pulley 570 is utilized to adjust an effective length of the cord 574 to secure the canopy 400 to a lower portion of the vehicle body 50. Further, the ratchet pulley 576 is utilized to adjust an effective length of the cord 574 to secure the canopy 400 to the lower portion of the vehicle body 50.

Second Adjustable Tightening Device

The second adjustable tightening device 422 is provided to secure the canopy 400 to a front cab portion 100 (shown in FIG. 8) of the vehicle 10. The second adjustable tightening device 422 includes a ratchet pulley 590 (shown in FIG. 24), a hook member 592, a cord 594, a ratchet pulley 596 (shown in FIG. 25), and a hook member 598.

The hook member 592 (shown in FIG. 21) is coupled to the ratchet pulley 590. The cord 594 is coupled to the ratchet pulley 590 and extends through the second aperture 552 of the second sleeve 542 to the ratchet pulley 596. The hook member 598 is further coupled to the ratchet pulley 596. During operation, the hook member 592 is secured to a portion of the vehicle body 50 proximate to the first front wheel 52 (shown in FIG. 8), and the hook member 598 is secured to a portion of the vehicle body 50 proximate to the second front wheel 56 (shown in FIG. 9). Further, the ratchet pulley 590 is utilized to adjust an effective length of the cord 594 to secure the canopy 400 to the front cab portion 100 of the vehicle body 50. Further, the ratchet pulley 596 is utilized to adjust an effective length of the cord 594 to secure the canopy 400 to the front cab portion 100 of the vehicle body 50.

First Adjustable Length Strap Assembly

Figure 22:
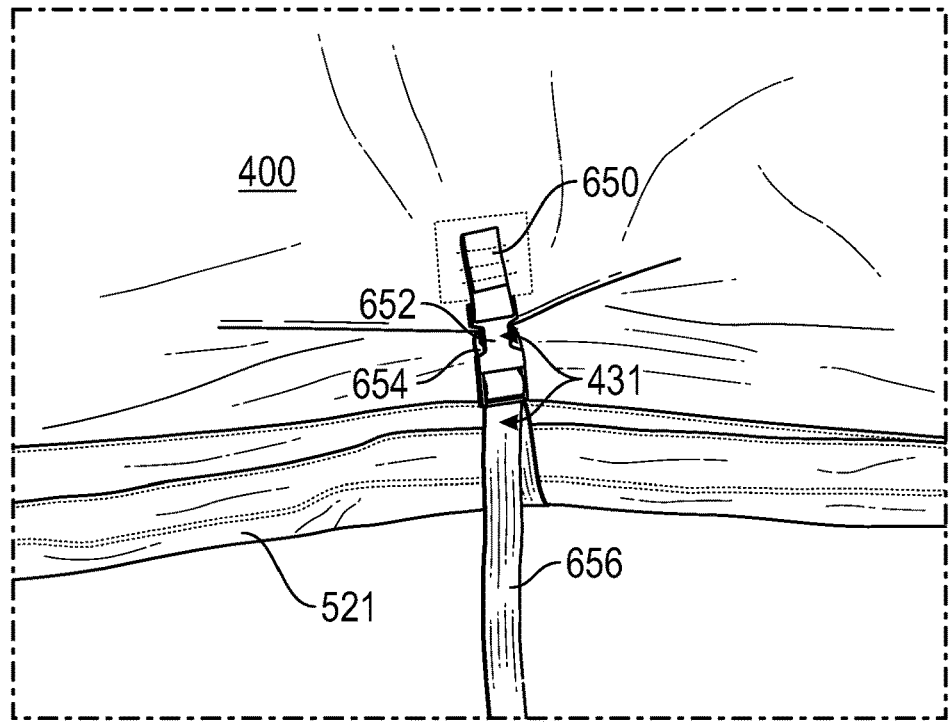
FIG. 22 is an enlarged schematic of a first adjustable length strap assembly of a canopy assembly in the vehicle cover assembly of FIG. 1 to secure the canopy assembly to a first side of the vehicle.

Referring to FIG. 22, the first adjustable length strap assembly 431 is provided to secure a portion of the canopy 400 to the first side 104 (shown in FIG. 8) of the vehicle body 50. The first adjustable length strap assembly 431 includes a first strap portion 650, a female coupling member 652, a male coupling member 654, a second strap portion 656, and a hook member (not shown). The first strap portion 650 is coupled to a lower portion of the canopy 400 above the first sleeve 521. The first strap portion 650 is further coupled to the female coupling member 652. The female coupling member 652 receives the male coupling member 654 therein to couple the female coupling member 652 to the male coupling member 654. The male coupling member 654 is further coupled to a second strap portion 656. The second strap portion 656 is further coupled to a hook member (not shown). During operation, the hook member (not shown) is coupled to a lower portion of vehicle body 50 and the effective length of the second strap portion 656 is adjusted utilizing the male coupling member 654 to couple the first adjustable length strap assembly 431 to the vehicle body 50.

Second Adjustable Length Strap Assembly

Figure 23:
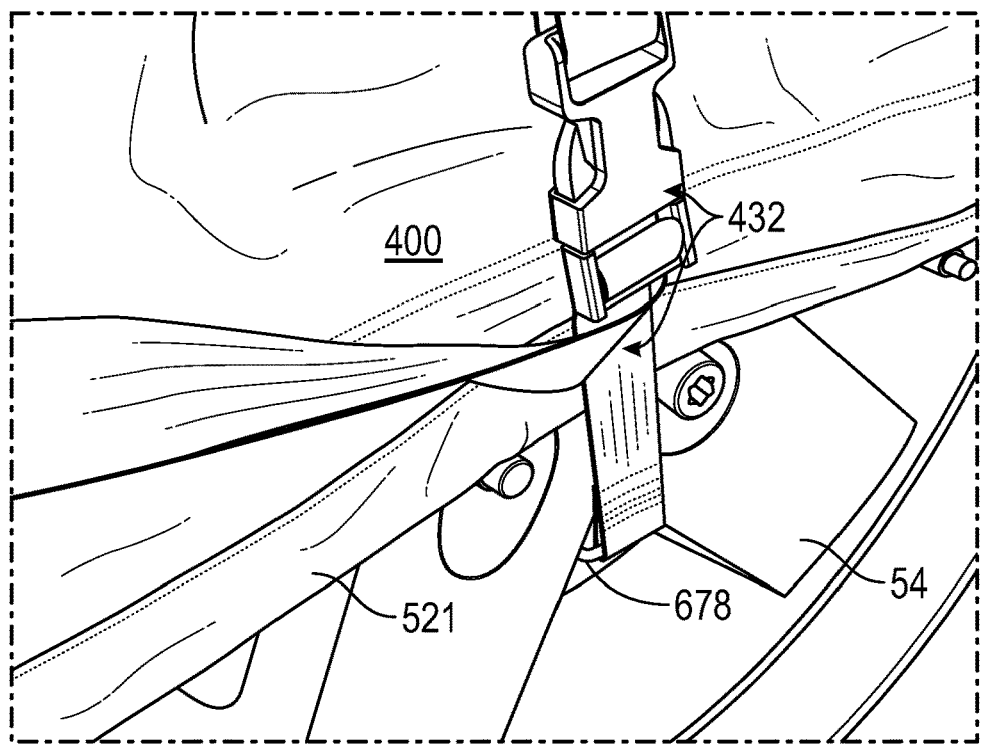
FIG. 23 is an enlarged schematic of a second adjustable length strap assembly of the canopy assembly in the vehicle cover assembly of FIG. 1 to secure the canopy assembly to a first rear wheel of the vehicle.

Referring to FIGS. 23 and 24, the second adjustable length strap assembly 432 is provided to secure a portion of the canopy 400 to the first rear wheel 54. The second adjustable length strap assembly 432 includes a first strap portion 670, a female coupling member 672, a male coupling member 674, a second strap portion 676, and a hook member 678. The first strap portion 670 is coupled to a lower portion of the canopy 400 above the first sleeve 521. The first strap portion 670 is further coupled to the female coupling member 672. The female coupling member 672 receives the male coupling member 674 therein to couple the female coupling member 672 to the male coupling member 674. The male coupling member 674 is further coupled to a second strap portion 676. The second strap portion 676 is further coupled to the hook member 678. During operation, the hook member 678 is coupled to the first rear wheel 54 and the effective length of the second strap portion 676 is adjusted utilizing the male coupling member 674 to couple the second adjustable length strap assembly 431 to the first rear wheel 54.

Third Adjustable Length Strap Assembly

Figure 28:
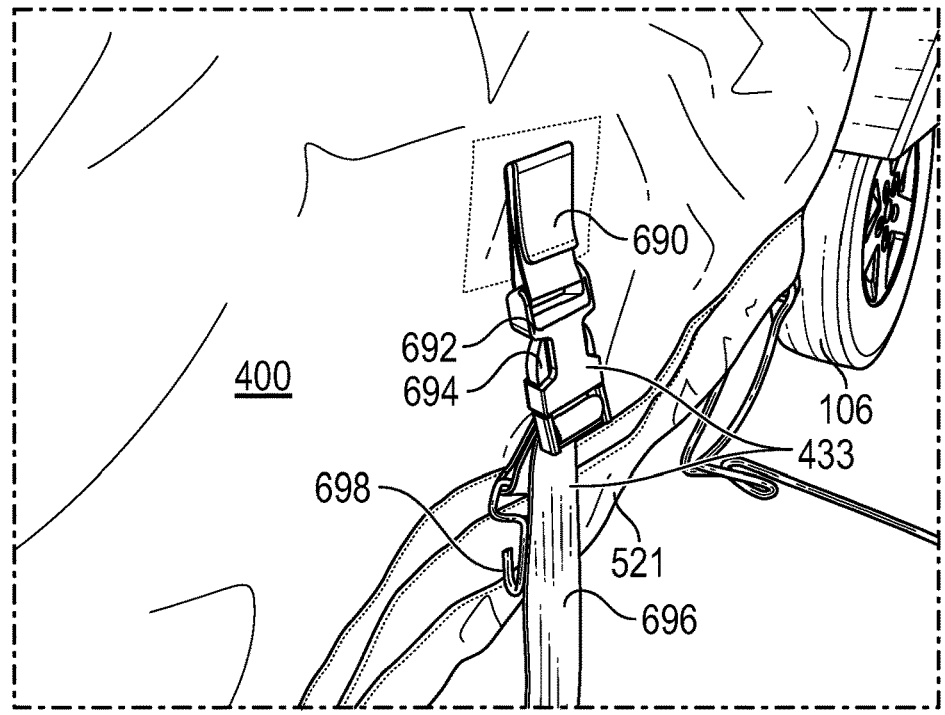
FIG. 28 is an enlarged schematic of a third adjustable length strap assembly of a canopy assembly in the vehicle cover assembly of FIG. 1 to secure the canopy assembly to a second side of the vehicle.

Referring to FIG. 28, the third adjustable length strap assembly 433 is provided to secure a portion of the canopy 400 to the second side 106 (shown in FIG. 9) of the vehicle body 50. The third adjustable length strap assembly 433 includes a first strap portion 690, a female coupling member 692, a male coupling member 694, a second strap portion 696, and a hook member 698. The first strap portion 690 is coupled to a lower portion of the canopy 400 above the first sleeve 521. The first strap portion 690 is further coupled to the female coupling member 692. The female coupling member 692 receives the male coupling member 694 therein to couple the female coupling member 692 to the male coupling member 694. The male coupling member 694 is further coupled to a second strap portion 696. The second strap portion 696 is further coupled to the hook member 698. During operation, the hook member 698 is coupled to a lower portion of vehicle body 50 and the effective length of the second strap portion 696 is adjusted utilizing the male coupling member 694 to couple the third adjustable length strap assembly 433 to the vehicle body 50.

Fourth Adjustable Length Strap Assembly

Figure 29:
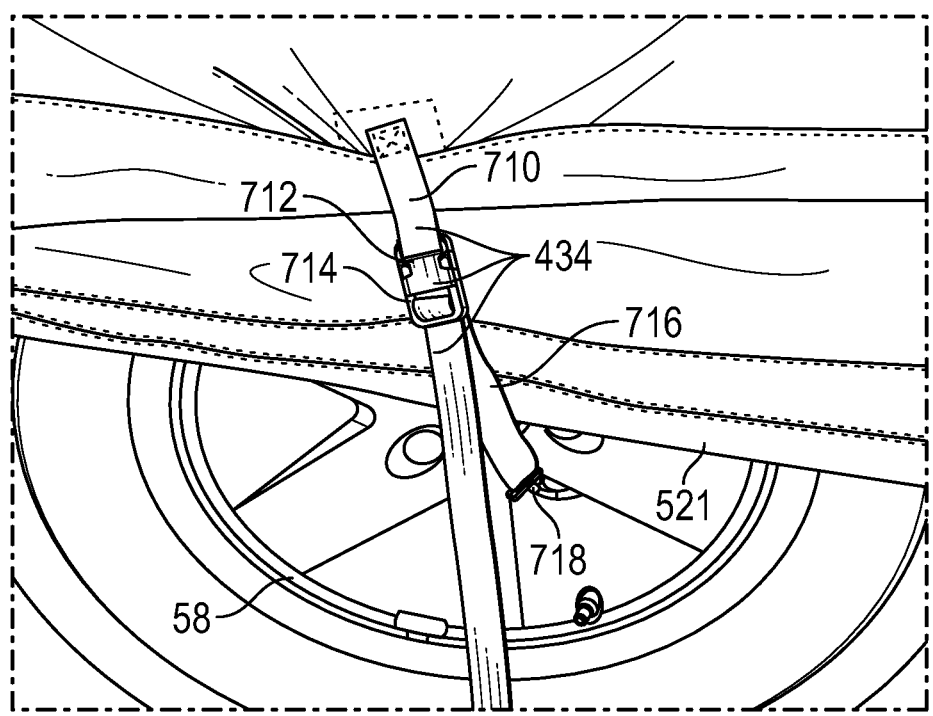
FIG. 29 is an enlarged schematic of a fourth adjustable length strap assembly of a canopy assembly in the vehicle cover assembly of FIG. 1 to secure the canopy assembly to a second rear wheel of the vehicle.
Figure 31:
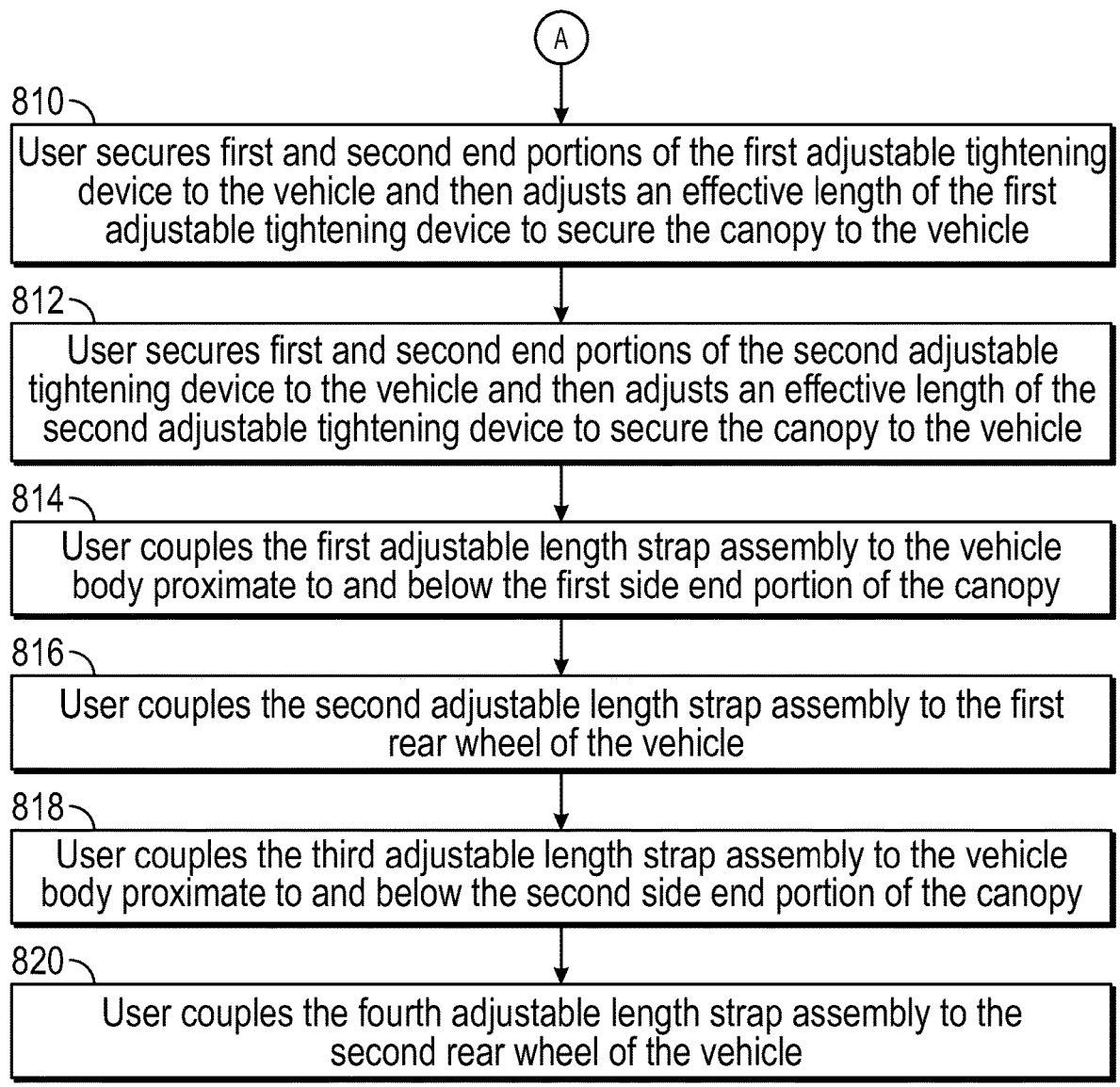
Figure 32:
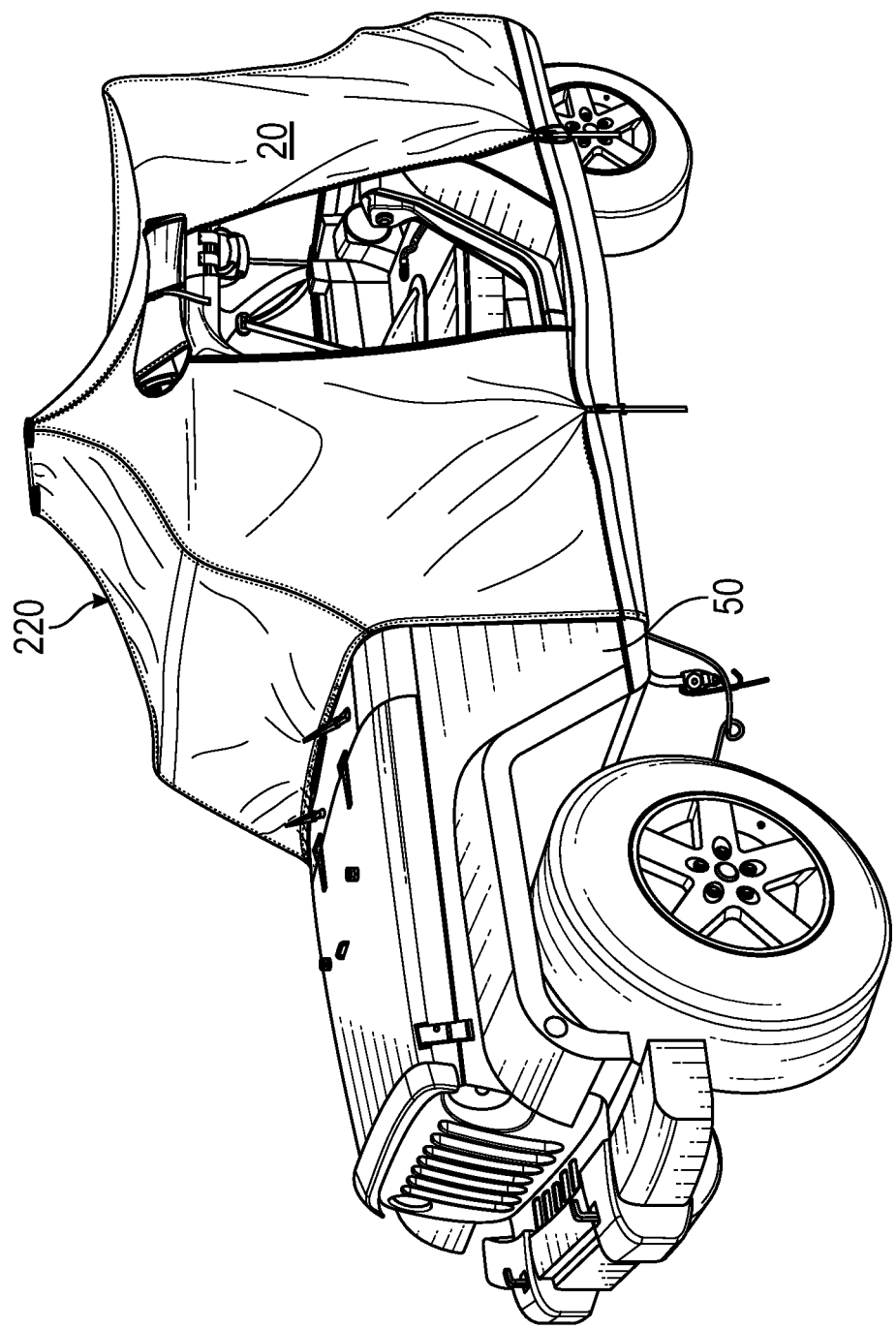
FIG. 32 is another schematic of the vehicle with the vehicle cover assembly coupled thereto.

Referring to FIG. 29, the fourth adjustable length strap assembly 434 is provided to secure a portion of the canopy 400 to the second rear wheel 58. The fourth adjustable length strap assembly 434 includes a first strap portion 710, a female coupling member 712, a male coupling member 714, a second strap portion 716, and a hook member 718. The first strap portion 710 is coupled to a lower portion of the canopy 400 above the first sleeve 521. The first strap portion 710 is further coupled to the female coupling member 712. The female coupling member 712 receives the male coupling member 714 therein to couple the female coupling member 712 to the male coupling member 714. The male coupling member 714 is further coupled to a second strap portion 716. The second strap portion 716 is further coupled to the hook member 718. During operation, the hook member 718 is coupled to the second rear wheel 58 and the effective length of the second strap portion 716 is adjusted utilizing the male coupling member 714 to couple the fourth adjustable length strap assembly 434 to the second rear wheel 58.

Method

Referring to FIGS. 1-31, a method for coupling the vehicle cover assembly 20 to the vehicle 10 in accordance with another exemplary embodiment will be explained.

At step 800, the user provides a canopy assembly 220 having a canopy 400, first and second coupling brackets 411, 412, first and second adjustable tightening devices 421, 422 and first, second, third and fourth adjustable length strap assemblies, 431, 432, 433, 434. The canopy 400 has a front peripheral end portion 500, a rear peripheral end portion 502, a first side end portion 504, and a second side end portion 506. The first side end portion 504, the rear peripheral end portion 502, and the second side end portion 506 define a first sleeve 521 with a first aperture 531 therein. The front peripheral end portion 500 defines a second sleeve 542 with a second aperture 552 therein. The first and second adjustable tightening devices 521, 520 extend through the first and second apertures 531, 552, respectively, of the first and second sleeves 521, 542, respectively. The first and second coupling brackets 411, 412 are coupled to the canopy 400. The first and second adjustable length strap assemblies 531, 532 are coupled to the canopy 400 proximate to and above the first side end portion 504. The third and fourth adjustable length strap assemblies 533, 534 are coupled to the canopy 400 proximate to and above the second side end portion 506.

At step 802, the user couples first and second support members 201, 202 (shown in FIG. 7) to a vehicle roof cross-member 124 extending between first and second B-pillars 120, 122 of the vehicle 10.

At step 804, the user couples a frame member 210 (shown in FIG. 11) to a rear end portion 102 of a vehicle body 50 of the vehicle 10.

At step 806, the user positions the canopy 400 (shown in FIG. 1) on the vehicle 10 such that the canopy 400 extends from a front cab portion 100 proximate the A-pillar 108 of the vehicle 10 to a rear end portion 102 of the vehicle body 50 and over the frame member 210 and the first and second support members 201, 202.

At step 808, the user inserts the first and second support members 201, 202 into the first and second coupling brackets 411, 412 (shown in FIG. 7), respectively, of the canopy assembly 220.

At step 810, the user secures first and second end portions (e.g., hook members 572, 578 shown in FIGS. 21 and 25) of the first adjustable tightening device 421 to the vehicle 10 and then adjusts an effective length of the first adjustable tightening device 421 to secure the canopy 400 to the vehicle 10.

At step 812, the user secures first and second end portions (e.g., hook members 592, 598 shown in FIGS. 21 and 25) of the second adjustable tightening device 422 to the vehicle 10 and then adjusts an effective length of the second adjustable tightening device 422 to secure the canopy 400 to the vehicle 10.

At step 814, the user couples the first adjustable length strap assembly 431 (shown in FIG. 22) to the vehicle body 50 proximate to and below the first side end portion 504 (shown in FIG. 1) of the canopy 400.

At step 816, the user couples the second adjustable length strap assembly 432 (shown in FIGS. 23 and 24) to the first rear wheel 54 of the vehicle 10.

At step 818, the user couples the third adjustable length strap assembly 433 (shown in FIG. 28) to the vehicle body 50 proximate to and below the second side end portion 506 of the canopy 400.

At step 820, the user couples the fourth adjustable length strap assembly 434 (shown in FIG. 29) to the second rear wheel 58 of the vehicle 10.

The vehicle cover assembly 20 provides a substantial advantage over other assemblies. In particular, the vehicle cover assembly 20 is easily removably coupled to the vehicle 10 to enclose a portion of the vehicle 10 for recreational purposes such as camping for example. In particular, the assembly 20 utilizes a frame member 210 to support a canopy 400 on the vehicle 10 and further utilizes first and second adjustable tightening devices 421, 422 that extend through first and second sleeves 521, 542 of the canopy 400 to easily secure the canopy 400 to the vehicle 10.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A vehicle cover assembly for a vehicle, the vehicle having a cross-member coupled to first and second B-pillars, comprising:
a canopy assembly having a canopy, first and second adjustable tightening devices, and a first coupling bracket; the canopy having a front peripheral end portion, a rear peripheral end portion, a first side end portion, and a second side end portion; the first side end portion, the rear peripheral end portion, and the second side end portion defining a first sleeve with a first aperture therein, the rear peripheral end portion being sized to extend across a rear end of the vehicle; the front peripheral end portion defining a second sleeve with a second aperture therein; the first adjustable tightening device extending through the first aperture of the first sleeve to secure the canopy to the vehicle, the second adjustable tightening device extending through the second aperture of the second sleeve to secure the canopy to the vehicle, the first coupling bracket being coupled to the canopy and extending through the canopy;
a first support member being sized and shaped to be partially disposed within the first coupling bracket and coupled to the cross-member of the vehicle; and
a frame member removably coupled to and between the vehicle and the canopy, the canopy being sized and shaped to extend from a front cab portion of the vehicle to a rear end portion of the vehicle and over the front cab portion, the first support member, and the frame member.

2. The vehicle cover assembly of claim 1, wherein:
the frame member includes a first vertical member, a second vertical member and a frame cross-member orthogonally connected to the first and second vertical members.

3. The vehicle cover assembly of claim 1, wherein:
the canopy defining a door between the front peripheral end portion and the rear peripheral end portion that communicates with an opening in a first side of the vehicle, the canopy assembly further having a first plurality of zipper teeth and a second plurality of zipper teeth bounding a first vertical side of the door that removably engage one another, and a third plurality of zipper teeth and a fourth plurality of zipper teeth bounding a second vertical side of the door that removably engage one another.

4. The vehicle cover assembly of claim 1, wherein the canopy is a fabric canopy.

5. A method for coupling a vehicle cover assembly to a vehicle, the vehicle having a cross-member coupled to first and second B-pillars, comprising:
providing a canopy assembly having a canopy, first and second adjustable tightening devices, and first and second coupling brackets; the canopy having a front peripheral end portion, a rear peripheral end portion, a first side end portion, and a second side end portion; the first side end portion, the rear peripheral end portion, and the second side end portion defining a first sleeve with a first aperture therein, the rear peripheral end portion being sized to extend across a rear end of the vehicle; the front peripheral end portion defining a second sleeve with a second aperture therein; the first adjustable tightening device extending through the first aperture of the first sleeve, the second adjustable tightening device extending through the second aperture of the second sleeve, the first and second coupling brackets being coupled to the canopy and extending through the canopy;
coupling a frame member to the vehicle;
coupling first and second support members to the cross-member of the vehicle;
positioning the canopy on the vehicle such that the canopy extends from a front cab portion of the vehicle to a rear end portion of the vehicle and over the front cab portion, the frame member, and the first and second support members;
inserting the first and second support members into the first and second coupling brackets, respectively, of the canopy assembly;
securing first and second end portions of the first adjustable tightening device to the vehicle and then adjusting an effective length of the first adjustable tightening device to secure the canopy to the vehicle; and
securing first and second end portions of the second adjustable tightening device to the vehicle and then adjusting an effective length of the second adjustable tightening device to secure the canopy to the vehicle.

6. The method of claim 5, wherein:

the canopy defining a door between the front peripheral end portion and the rear peripheral end portion that communicates with an opening in a first side of the vehicle, the canopy assembly further having a first plurality of zipper teeth and a second plurality of zipper teeth bounding a first vertical side of the door that removably engage one another, and a third plurality of zipper teeth and a fourth plurality of zipper teeth bounding a second vertical side of the door that removably engage one another.

7. The method of claim 5, wherein:

the first sleeve being disposed below a vehicle body of the vehicle when the canopy is disposed on the vehicle.

8. The vehicle cover assembly of claim 1, further comprising:

a second support member;

the canopy assembly further includes a second coupling bracket being coupled to the canopy and extending through the canopy; and the second support member being sized and shaped to be partially disposed within the second coupling bracket and coupled to the cross-member.

9. The vehicle cover assembly of claim 1, wherein:

the first sleeve being disposed below a vehicle body of the vehicle when the canopy is disposed on the vehicle.

10. A vehicle cover assembly for a vehicle, the vehicle having a cross-member coupled to first and second B-pillars, comprising:

a canopy assembly having a canopy, first and second adjustable tightening devices, and first and second coupling brackets; the canopy having a front peripheral end portion, a rear peripheral end portion, a first side end portion, and a second side end portion; the first side end portion, the rear peripheral end portion, and the second side end portion defining a first sleeve with a first aperture therein, the first sleeve being disposed below a vehicle body of the vehicle when the canopy is disposed on the vehicle, the rear peripheral end portion being sized to extend across a rear end of the vehicle; the front peripheral end portion defining a second sleeve with a second aperture therein; the first adjustable tightening device extending through the first aperture of the first sleeve to secure the canopy to the vehicle, the second adjustable tightening device extending through the second aperture of the second sleeve to secure the canopy to the vehicle, the first and second coupling brackets being coupled to the canopy;

a first support member being sized and shaped to be partially disposed within the first coupling bracket and coupled to the cross-member of the vehicle;

a second support member being sized and shaped to be partially disposed within the second coupling bracket and coupled to the cross-member of the vehicle; and a frame member removably coupled to and between the vehicle and the canopy, the canopy being sized and shaped to extend from a front cab portion of the vehicle to a rear end portion of the vehicle and over the front cab portion, the first and second support members, and the frame member.

11. The vehicle cover assembly of claim 10, wherein:

the canopy defining a door between the front peripheral end portion and the rear peripheral end portion that communicates with an opening in a first side of the vehicle, the canopy assembly further having a first plurality of zipper teeth and a second plurality of zipper teeth bounding a first vertical side of the door that removably engage one another, and a third plurality of zipper teeth and a fourth plurality of zipper teeth bounding a second vertical side of the door that removably engage one another.

* * * * *